(12) United States Patent
Sugimura et al.

(10) Patent No.: US 10,964,042 B2
(45) Date of Patent: Mar. 30, 2021

(54) DETECTION DEVICE, METHOD AND STORAGE MEDIUM FOR OPTICALLY DETECTING DISTANCE FROM A SINGLE VIEWPOINT TO AN OBJECT

(71) Applicant: NIKON CORPORATION, Tokyo (JP)

(72) Inventors: Takeaki Sugimura, Tokyo (JP); Yoshihiro Nakagawa, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 200 days.

(21) Appl. No.: 16/076,386

(22) PCT Filed: Feb. 26, 2016

(86) PCT No.: PCT/JP2016/055809
§ 371 (c)(1),
(2) Date: Sep. 26, 2018

(87) PCT Pub. No.: WO2017/145356
PCT Pub. Date: Aug. 31, 2017

(65) Prior Publication Data
US 2019/0043212 A1 Feb. 7, 2019

(51) Int. Cl.
*G06T 7/521* (2017.01)
*G01B 11/24* (2006.01)
(Continued)

(52) U.S. Cl.
CPC .............. *G06T 7/62* (2017.01); *G01B 11/24* (2013.01); *G06T 7/40* (2013.01); *G06T 7/507* (2017.01);
(Continued)

(58) Field of Classification Search
None
See application file for complete search history.

(56) References Cited

U.S. PATENT DOCUMENTS

| 2003/0231174 A1 | 12/2003 | Matusik et al. |
| 2004/0001059 A1 | 1/2004 | Pfister et al. |

(Continued)

FOREIGN PATENT DOCUMENTS

| JP | 2004-164571 A | 6/2004 |
| JP | 2008-002995 A | 1/2008 |

(Continued)

OTHER PUBLICATIONS

May 17, 2016 International Search Report issued in International Patent Application No. PCT/JP2016/055809.
(Continued)

*Primary Examiner* — Idowu O Osifade
(74) *Attorney, Agent, or Firm* — Oliff PLC

(57) ABSTRACT

A detection device including: a detector that detects an object from one viewpoint; a reliability calculator that calculates reliability information on the object at the one viewpoint by using a detection result of the detector; and an information calculator that calculates shape information on the object at the one viewpoint by using the detection result of the detector and the reliability information and calculates texture information on the object at the one viewpoint by using the detection result, the information calculator generates model information on the object at the one viewpoint based on the shape information and the texture information.

36 Claims, 23 Drawing Sheets

(51) Int. Cl.
*G06T 7/62* (2017.01)
*G06T 7/507* (2017.01)
*G06T 7/70* (2017.01)
*G06T 7/40* (2017.01)

(52) U.S. Cl.
CPC ............ G06T 7/521 (2017.01); G06T 7/70 (2017.01); *G06T 2207/10028* (2013.01)

(56) References Cited

U.S. PATENT DOCUMENTS

| | | | |
|---|---|---|---|
| 2007/0296979 A1 | 12/2007 | Morimoto et al. | |
| 2010/0231583 A1 | 9/2010 | Furukawa et al. | |
| 2013/0108116 A1* | 5/2013 | Suzuki | G06T 7/75 382/106 |
| 2013/0162643 A1* | 6/2013 | Cardle | G06T 17/00 345/420 |
| 2013/0176305 A1* | 7/2013 | Ito | G01C 15/002 345/420 |
| 2014/0037194 A1* | 2/2014 | Kitamura | G01B 11/24 382/154 |
| 2015/0381968 A1* | 12/2015 | Arora | G06T 17/00 348/47 |
| 2016/0139674 A1* | 5/2016 | Watanabe | G06F 3/0425 345/156 |
| 2016/0182889 A1* | 6/2016 | Olmstead | G01B 11/2513 348/47 |
| 2016/0275686 A1* | 9/2016 | Zach | G06K 9/6201 |

FOREIGN PATENT DOCUMENTS

| | | |
|---|---|---|
| JP | 2010-134546 A | 6/2010 |
| WO | 2009/016808 A1 | 2/2009 |

OTHER PUBLICATIONS

May 17, 2016 Written Opinion issued in International Patent Application No. PCT/JP2016/055809.
Apr. 7, 2020 Office Action issued in Japanese Patent Application No. 2018-501525.
Dec. 3, 2019 Office Action issued in Japanese Patent Application No. 2018-501525.

* cited by examiner

DETECTION DEVICE, METHOD AND STORAGE MEDIUM FOR OPTICALLY DETECTING DISTANCE FROM A SINGLE VIEWPOINT TO AN OBJECT

FIELD OF THE INVENTION

The present invention relates to a detection device, a method of detection, an information processing device, and a storage medium.

BACKGROUND

Developed is a technique that detects an object by a plurality of imaging devices and inputs a plurality of obtained images to a computer to acquire a three-dimensional shape of the object (for example, see Japanese Unexamined Patent Application Publication No. 2010-134546).

In the technique described above, it is desired that the three-dimensional shape of the object be able to be constructed with high precision from a result obtained by detecting the object.

SUMMARY

A first aspect of the present invention provides a detection device including: a detector that detects an object from one viewpoint; a reliability calculator that calculates reliability information on the object at the one viewpoint by using a detection result of the detector; and an information calculator that calculates shape information on the object at the one viewpoint by using the detection result of the detector and the reliability information and calculates texture information on the object at the one viewpoint by using the detection result, the information calculator generates model information on the object at the one viewpoint based on the shape information and the texture information.

A second aspect of the present invention provides a detection device including: a detector that detects an object from one viewpoint; a reliability calculator that calculates reliability information on the object at the one viewpoint by using a detection result of the detector; and an information calculator that calculates point cloud data that indicates coordinates among a plurality of points on the object by using the detection result and the reliability information and calculates shape information on the object at the one viewpoint based on the point cloud data.

A third aspect of the present invention provides a detection device including: a detector that images an object from one viewpoint; a reliability calculator that calculates reliability information on the object at the one viewpoint by using a taken image imaged by the detector; and an information calculator that calculates texture information on the object at the one viewpoint by using the taken image and the reliability information.

A fourth aspect of the present invention provides a detection system including: a plurality of the detection devices according to the first aspect; and an information processing device that processes information output from the detection devices, the detection devices each outputs model information including at least one of the shape information and the texture information, the information processing devices including a model integrator that integrates pieces of information output from the detection devices.

A fifth aspect of the present invention provides a method of detection including: detecting an object by a detector from one viewpoint; calculating reliability information on the object at the one viewpoint by using a detection result of the detector; calculating shape information on the object at the one viewpoint by using the detection result of the detector and the reliability information and calculating texture information on the object at the one viewpoint by using the detection result; and generating model information on the object at the one viewpoint based on the shape information and the texture information.

A sixth aspect of the present invention provides a information processing device including: a receiver that receives first model information that is calculated by using a first detection result and first reliability information and includes at least one of shape information and texture information on an object at one viewpoint and second model information that is calculated by using a second detection result and second reliability information and includes at least one of shape information and texture information on the object at a viewpoint that is different from the one viewpoint; and a model integrator that integrates the first model information and the second model information.

A seventh aspect of the present invention provides a storage medium storing therein a processing program that processes a detection result obtained by detecting an object by a detector from one viewpoint, the processing program causing a computer to execute: calculating reliability information on the object at the one viewpoint by using the detection result of the detector; and calculating at least one of shape information and texture information on the object at the one viewpoint by using the detection result of the detector and the reliability information.

DESCRIPTION OF EMBODIMENTS

First Embodiment

Figure 1A:
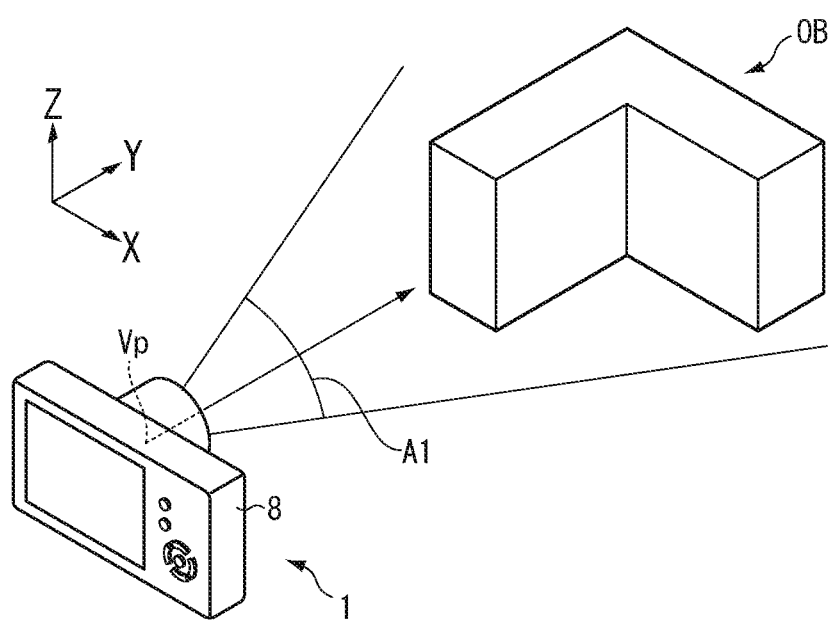
FIGS. 1A and 1B are diagrams of an example of a detection device according to a first embodiment.

A first embodiment is described. FIG. 1A is a conceptual diagram of an example of a detection device 1 according to the first embodiment. The detection device 1 is, for example, an imaging device and detects an object OB in a detection area A1 (for example, a field of view). For example, the detection device 1 may be a stationary camera, a camera the field of view of which is able to be manually or automatically changed, or a portable information terminal (for example, a smartphone, a tablet, or a camera-equipped cellular phone). The detection device 1 uses a result obtained by detecting the object OB to perform calculation processing on information about the object OB. The detection device 1 models at least a part of the object OB by the calculation processing by the device itself and calculates model information (model data). For example, the detection device 1 applies computer graphics processing (CG processing) by the calculation processing to at least a part of the object OB to calculate model information (for example, CG model data). The model information includes, for example, at least one of shape information that indicates a three-dimensional shape of the object OB and texture information that indicates a pattern of the surface of the object OB. For another example, the model information includes at least one of three-dimensional point coordinates, information related to the point coordinates, texture information on a surface defined by the point coordinates and the related information, image spatial information such as illumination conditions for the entire image and light source information, and polygon data as shape information. The texture information includes, for example, at least one piece of information on a character, a figure, a pattern, information defining unevenness, a particular image, and a color (for example, a chromatic color or an achromatic color) on the surface of the object OB. For example, the detection device 1 calculates the model information that indicates the object OB viewed from a viewpoint Vp (for example, a certain viewpoint, one viewpoint, a single viewpoint, or one direction). For example, the detection device 1 calculates the model information that indicates the object OB viewed from one viewpoint in a certain angle relative to the object OB.

Figure 1B:
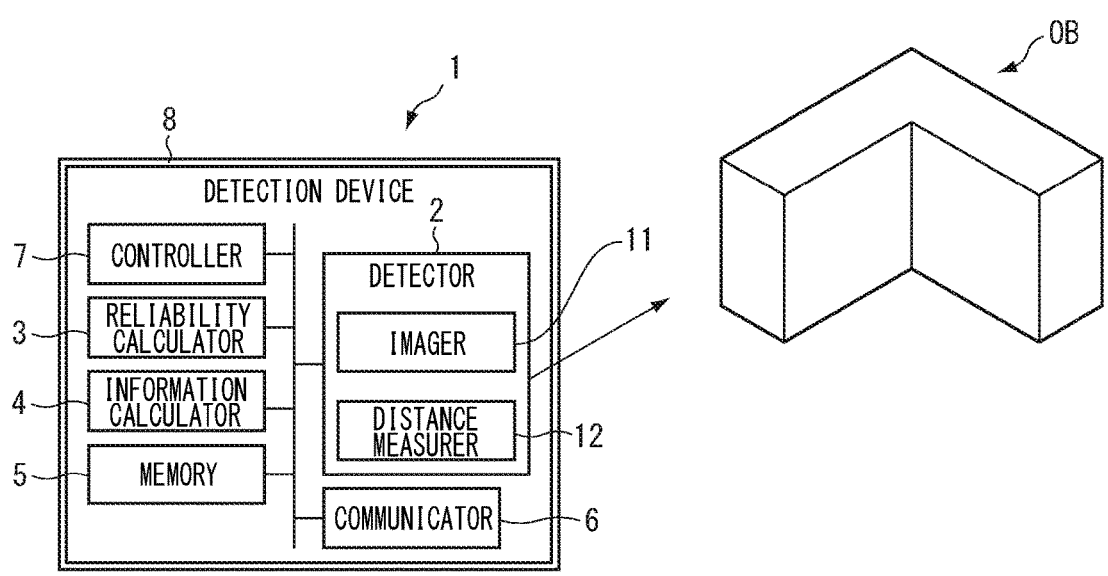

FIG. 1B is a block diagram of an example of a configuration of the detection device 1. For example, the detection device 1 includes a detector 2, a reliability calculator 3, an information calculator 4, a memory 5, a communicator 6, a controller 7, and a main body 8. The main body 8 is, for example, a camera body, a case, or a housing. For example, the detector 2, the reliability calculator 3, and the information calculator 4 are provided in the main body 8.

The detector 2 detects the object OB from the viewpoint Vp. The reliability calculator 3 calculates reliability information on the object OB at the viewpoint Vp. For example, the reliability calculator 3 calculates the reliability information on the object OB corresponding to the viewpoint Vp. The reliability information includes, for example, at least one of a reliability of a body being present at a position in an area including the object OB (for example, the detection area A1 or the field of view of the detector 2), reliability distribution, and an expected value. This reliability distribution is, for example, information that indicates the relation between the reliability of a partial area of the detection area of the detector 2 and the reliability of an area therearound. The reliability information includes, for example, detection result reliability of the detector 2 for a position in an area including the object OB (for example, the detection area or the field of view of the detector 2). For example, the reliability numerically expresses the accuracy (the degree of accuracy, precision, or reliability) or the inaccuracy (ambiguity or unclearness) of data at the position. The reliability information includes reliability distribution at a plurality of positions. For example, the reliability being high corresponds to the accuracy being high or the inaccuracy being low. For example, the reliability being low corresponds to the accuracy being low or the inaccuracy being high. For example, the detector 2 transmits a detection result (for example, image data) obtained by detecting the object OB to the information calculator 4, and the reliability calculator 3 transmits the calculated reliability information on the object OB to the information calculator 4. The information calculator 4 calculates at least one of the shape information and the texture information on the object OB at the viewpoint Vp by using the received detection result of the detector 2 and the reliability information. For example, the information calculator 4 calculates at least one of the shape information and the texture information on the object OB when viewed from the viewpoint Vp. For example, the reliability calculator 3 calculates pieces of the reliability information for respective areas of the object OB, and the information calculator 4 associates the reliability information calculated for each area of the object OB with at least one of the shape information and the texture information. The following describes the components in the detection device 1.

Figure 2:
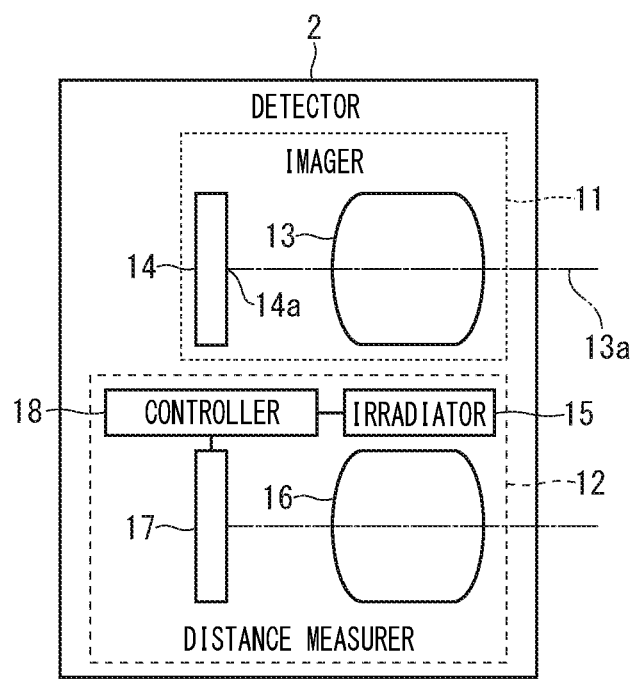
FIG. 2 is a diagram of an example of a detector according to the first embodiment.

FIG. 2 is a diagram of an example of the detector 2. For example, the detector 2 optically detects the object OB from the viewpoint Vp. For example, the detector 2 acquires at least one of an image when the object OB is viewed from one viewpoint (the viewpoint Vp) and a distance from the one viewpoint (the viewpoint Vp) to a point on the object OB. For example, the detector 2 may detect the object OB at a certain angle of sight. For example, the detector 2 may detect the object OB at a certain line of sight (for example, a single line of sight). The detector includes, for example, an imager 11 and a distance measurer 12. The imager 11 images the object OB from the viewpoint Vp and outputs image data of the object OB or the like as a detection result. The detection result of the detector 2 includes, for example, the image data of the detected object OB. The distance measurer 12 detects the distance from the viewpoint Vp (refer to FIG. 1A) to a point on the object OB. The detector 2 does not necessarily include the imager 11 or the distance measurer 12.

The imager 11 includes an image-forming optical system 13 and an imaging element 14. The image-forming optical system 13 forms an image of the object OB. The image-forming optical system 13 is, for example, held in a lens barrel and is mounted on the main body 8 (refer to FIG. 1) together with the lens barrel. The image-forming optical system 13 and the lens barrel are, for example, interchangeable lenses and are detachable from the main body 8. The image-forming optical system 13 and the lens barrel may be built-in lenses. For example, the lens barrel may be a part of the main body 8 and may be undetachable from the main body 8.

The imaging element 14 is, for example, a CMOS image sensor or a CCD image sensor in which a plurality of pixels are two-dimensionally arrayed. For example, the imaging element 14 is housed in the main body 8. The imaging element 14 takes the image formed by the image-forming optical system 13. An imaging result (a detection result) of the imaging element 14 includes, for example, information on a gray-scale value of each color of each pixel (for example, RGB data). For example, the imaging element 14 outputs the imaging result in a full-color image data format.

The distance measurer 12 detects the distance from a point on the surface of the object OB. For example, the distance measurer 12 measures the distance by time of flight (TOF). The distance measurer 12 may detect the measurement by another method. For example, the distance measurer 12 may include a laser scanner to detect the distance by laser scanning. For example, the distance measurer 12 may project a certain pattern onto the object OB to detect the distance on the basis of a detection result of this pattern. The distance measurer 12 may include a phase difference sensor to detect the distance by phase difference. The distance measurer 12 may detect the distance by depth from defocus (DFD). When DFD is used, the distance measurer 12 may use at least one of the image-forming optical system 13 and the imaging element 14 of the imager 11.

For example, the distance measurer 12 includes an irradiator 15, an image-forming optical system 16, an imaging element 17, and a controller 18. The irradiator 15 is able to irradiate the object OB with infrared light. The irradiator 15 is controlled by the controller 18. The controller 18 temporally changes (for example, amplitude modulates) the intensity of the infrared light applied from the irradiator 15. The image-forming optical system 16 forms an image of the object OB. The image-forming optical system 16, similarly to the image-forming optical system 13, may be at least a part of interchangeable lenses or at least a part of built-in lenses. The imaging element 17 is, for example, a CMOS image sensor or a CCD image sensor. The imaging element 17 has sensitivity to at least a wavelength band of light applied by the irradiator 15. The imaging element 17 is, for example, controlled by the controller 18 to detect infrared light reflected and scattered by the object OB. For example, the imaging element 17 takes the image formed by the image-forming optical system 16.

The controller 18 detects a distance (depth) from a point on the surface of the object OB to the imaging element 17 by using a detection result by the imaging element 17. For example, the time of flight of light that enters the imaging element 17 from a point on the surface of the object OB changes in accordance with the depth of this point. The output of the imaging element 17 changes in accordance with the time of flight, and the controller 18 calculates the depth on the basis of the output of the imaging element 17, for example. For example, the controller 18 calculates the depth for each partial area (for example, one pixel or a plurality of pixels) of the image taken by the imaging element 17 and associates the position in this area and the depth with each other to calculate (generate) depth information. The depth information includes, for example, information in which the position of a point on the surface of the object OB and the distance (depth or the degree of depth) from this point to the detection device 1 are associated with each other. The depth information includes, for example, information (for example, a depth image) that indicates depth distribution (for example, a depth map) in the object OB.

Figure 3A:
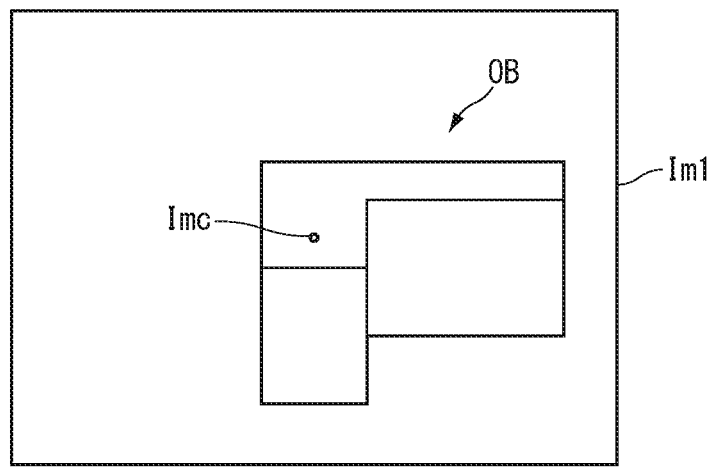
FIGS. 3A to 3C are illustrative diagrams of reliability information based on the optical characteristics of the detector according to the first embodiment.
Figure 3B:
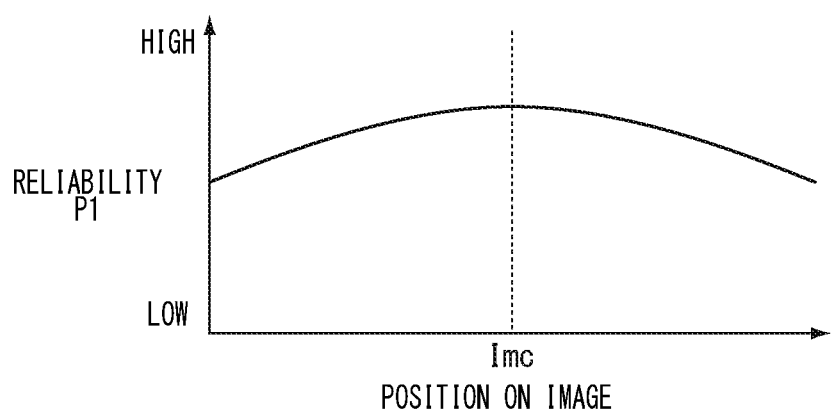
Figure 3C:
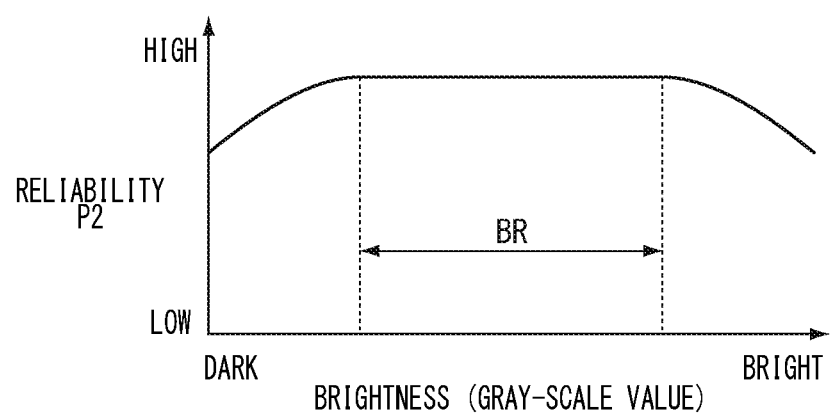

Next, the reliability information calculated by the reliability calculator 3 is described. For example, the reliability calculator 3 (refer to FIG. 1B) calculates the reliability information on the basis of the optical characteristics of the optical system (for example, the image-forming optical system 13 and the image-forming optical system 16) provided in the detector 2. FIGS. 3A to 3C are illustrative diagrams of the reliability information based on the optical characteristics of the detector 2.

FIG. 3A is a conceptual diagram of an example of a taken image Im1 by the imager 11. For example, the image-forming optical system 13 (refer to FIG. 2) has a larger aberration as the distance from an optical axis 13a increases. For example, the optical axis 13a of the image-forming optical system 13 corresponds to a field-of-view center 14a of the imager 11; for an area (for example, one pixel or a plurality of pixels) with a larger distance from the field-of-view center 14a in the imaging element 14, the imager 11 reduces detection result reliability using this area. In FIG. 3A, the symbol Imc is a position on the taken image Im1 corresponding to the field-of-view center of the imager 11. For example, the taken image Im1 has a larger influence of aberration as the distance from the position Imc increases and reduces the reproducibility (the detection result reliability) of a subject due to blurring or the like. For example, the reliability calculator 3 calculates the reliability information on the basis of the distance from the position Imc for each area (for example, one pixel or a plurality of pixels) of the taken image Im1.

FIG. 3B is a conceptual diagram of an example of the reliability corresponding to the distance from the field-of-view center (the position Imc) of the imager 11 on the taken image Im1. In FIG. 3B, the vertical axis is a reliability P1, whereas the horizontal axis is a position on the taken image Im1. In FIG. 3B, the reliability P1 is maximized at the position Imc and reduced as the distance from the position Imc increases. The relation between the reliability P1 and the distance from the field-of-view center of the imager 11 is, for example, determined on the basis of the distribution of aberration on the imaging element 14 by the image-forming optical system 13. Although the reliability P1 changes nonlinearly relative to the distance from the position Imc in this example, the reliability P1 may change linearly or change discontinuously (for example, stepwise) relative to the distance from the position Imc.

Information that indicates the relation between the reliability P1 and the distance from the field-of-view center of the imager 11 on the taken image Im1 (hereinafter, referred to as first relation information) is, for example, stored in the memory 5 (refer to FIG. 1B) in advance. For example, the reliability calculator 3 calculates the distance from the position Imc for each area (for example, one pixel or a plurality of pixels) of the taken image Im1. The reliability calculator 3 compares the calculated distance with the first relation information to calculate the reliability P1 in this area. For example, the reliability calculator 3 calculates, as the reliability information, information in which the position in each area and the reliability P1 are associated with each other (hereinafter, referred to as information on the reliability P1).

The reliability calculator 3 may calculate the reliability information on the basis of the aberration (for example, aberration distribution) of the image-forming optical system 13. The reliability calculator 3 may calculate the reliability information on the basis of the aberration of the image-forming optical system 13 and the distance from the field-of-view center. The reliability calculator 3 may calculate the reliability information on the basis of at least one of the distance from the field-of-view center of the distance measurer 12 and the aberration of the image-forming optical system 16 for the detection result of the distance measurer 12.

For example, the taken image Im1 may be saturated in brightness in its partial area by reflected light from the object OB. On the object OB, for example, there may be a dark part such as a shade of another body when viewed from the viewpoint Vp. For example, the reliability calculator 3 may calculate the reliability information on the basis of brightness (brightness and darkness) in the taken image Im1. FIG. 3C is a conceptual diagram of an example of a reliability P2 corresponding to the brightness in the taken image Im1. In FIG. 3C, the vertical axis is the reliability P2, whereas the horizontal axis is the brightness (for example, a pixel gray-scale value). In this example, the reliability P2 is constant when the brightness is within a certain range BR, the reliability P2 decreases as the brightness decreases (darkens) than that in the range BR, and the reliability P2 decreases as the brightness increases (brightens) than that in the range BR. The relation between the brightness and the reliability is set to any desired relation on the basis of an experiment, a simulation, or the like, for example. For example, the reliability P2 may change nonlinearly, change linearly, or change discontinuously (for example, stepwise) relative to the brightness.

Information that indicates the relation between the brightness and the reliability (hereinafter, referred to as second relation information) is, for example, stored in the memory 5 (refer to FIG. 1B) in advance. The reliability calculator 3 compares the brightness (for example, a gray-scale value) for each area (for example, one pixel or a plurality of pixels) of the taken image with the second relation information to calculate the reliability P2 in this area. For example, the reliability calculator 3 calculates, as the reliability information, information in which the position in each area and the reliability P2 are associated with each other (hereinafter, referred to as information on the reliability P2).

At least one of the information on the reliability P1 and the information on the reliability P2 may be stored in the same file as that for data on the taken image. For example, the data structure (data format) of this information may be a structure that pairs pixel gray-scale values (respective gray-scale values of R, G, and B) and the reliability (for example, at least one of the reliability P1 and the reliability P2). At least one of the information on the reliability P1 and the information on the reliability P2 may be stored in a file separate from that for the data on the taken image. For example, the data structure of the information on the reliability P1 may be a structure that, corresponding to the pixel arrangement of the taken image, arranges the values of the reliabilities of the respective pixels. The reliability calculator 3 does not necessarily calculate the reliability information based on the optical characteristics of the optical system (for example, the image-forming optical system 13 and the image-forming optical system 16) provided in the detector 2. For example, the reliability calculator does not necessarily calculate at least one of the reliability P1 and the reliability P2.

Figure 4A:
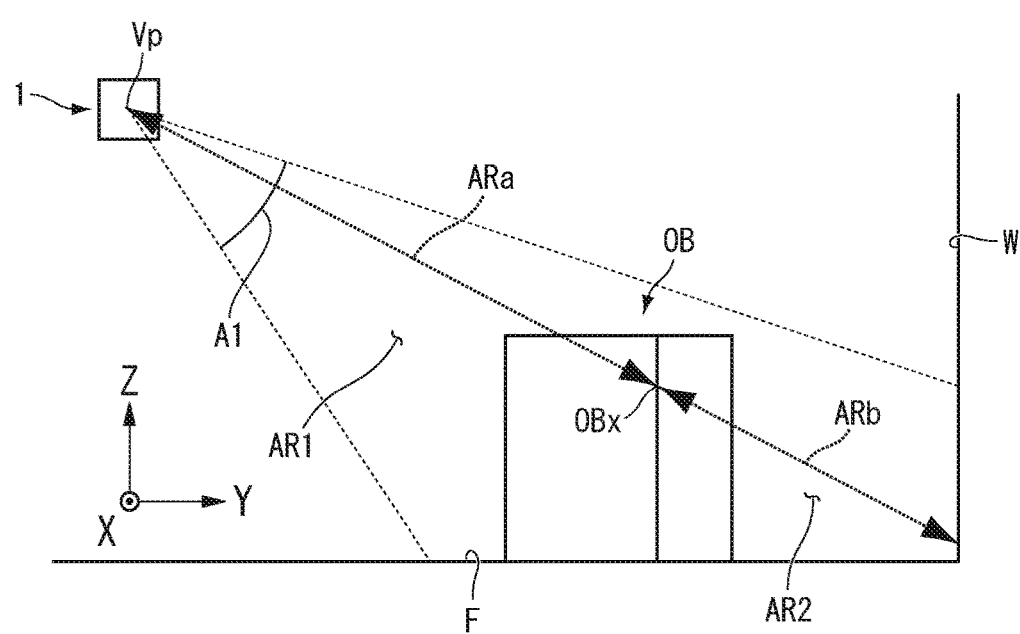
FIGS. 4A and 4B are conceptual diagrams of an example of a detection area of the detection device according to the first embodiment.
Figure 4B:
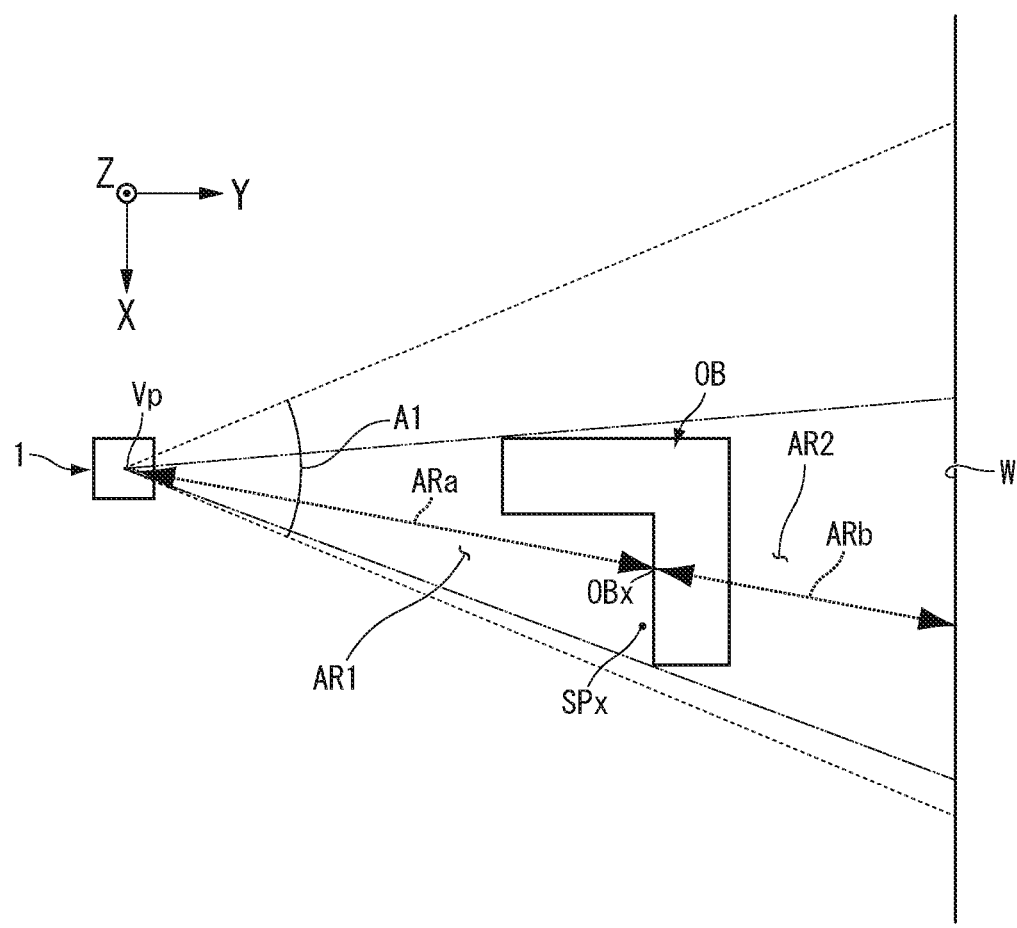

Next, the reliability information on an area including the surroundings of the object OB is described. FIGS. 4A and 4B are conceptual diagrams of an example of the detection area A1 of the detection device 1 (the detector 2). FIG. 4A illustrates a conceptual diagram when the object OB and the detection device 1 are viewed from an X direction (for example, a side). FIG. 4B illustrates a conceptual diagram when the object OB and the detection device 1 are viewed from a Z direction (for example, above).

For example, the reliability calculator 3 calculates, as the reliability information, information that discriminates between a first area detectable from the viewpoint Vp (for example, an area in which the object OB is able to be viewed in a plan view from the viewpoint Vp) AR1 and a second area shaded by the first area AR1 when viewed from the viewpoint Vp (for example, an area in which the object OB is not able to be viewed in a plan view from the viewpoint Vp) AR2, in the area including the object OB (for example, the detection area A1 of the detector 2). The detection area A1 is, for example, the field of view of the detection device 1 (for example, the detector 2). The first area AR1 includes, for example, an area between surfaces of bodies detected by the detector 2 (for example, the object OB, the background, a floor F in FIG. 4A, and a wall W in FIG. 4B) and the detector 2 in the detection area A1. In FIGS. 4A and 4B, the symbol OBx is any desired point on the surface of a body detected by the detector 2 (for example, an object). The position of the point OBx is, for example, represented by three-dimensional coordinates based on the viewpoint Vp and is obtained by the shape information calculated by the information calculator 4 (for example, point cloud data or surface information described below). The reliability calculator 3 determines an area ARa between the viewpoint Vp and the point OBx to be the first area AR1. The area ARa is, for example, an area in which the reliability of an object that blocks light being present on a line connecting the viewpoint Vp with the point OBx is low. The first area AR1 is, for example, a set of areas ARa for a plurality of the respective points OBx. For example, the first area AR1 is a gap (gas space). For example, the reliability calculator 3 calculates coordinates that indicate the range of the first area AR1 on the basis of the shape information calculated by the information calculator 4. For example, the reliability calculator 3 calculates, as the reliability information, information in which coordinates that indicate the first area AR1 and the reliability that indicates that the reliability of an object that blocks light being present in the first area AR1 is low (the reliability of an object that blocks light being not present in the first area AR1 is high) are associated with each other.

For example, the reliability calculator 3 determines an area ARb that is on the line connecting the viewpoint Vp with the point OBx on the object OB and is farther from the viewpoint Vp than the point OBx is, to be the second area AR2. The second area AR2 is, for example, a set of areas ARb for a plurality of respective points OBx. The second area AR2 is, for example, an area that is lower in the detection result reliability of the detector 2 than the first area AR1. For example, when the part of the point OBx is glass or the like, the detection result reliability of the detector 2 about the second area AR2 can reduce due to the refraction, reflection, scattering, or the like of light directed from the second area AR2 toward the viewpoint Vp on the point OBx. When the part of the point OBx is a material that does not pass light, the second area AR2 may be undetectable from the viewpoint Vp. In such a case, the reliability calculator 3 may calculate, as the reliability information, information that indicates that the second area AR2 is an area that is undetectable from the viewpoint Vp.

Thus, the reliability calculator 3 may calculate the information on the area around the object OB (for example, the reliability information on the first area AR1 and the reliability information on the second area AR2). The reliability calculator 3 may calculate information on space (for example, a gap) on the side of the object OB relative to the viewpoint Vp. The symbol SPx in FIG. 4B is a point in the space on the side of the object OB. The distance between the point SPx and the viewpoint Vp is, for example, the same as the distance between the viewpoint Vp and the point OBx. For example, the reliability calculator 3 determines whether the point SPx belongs to the first area AR1 (an area closer to the viewpoint Vp than the surface of the body). When determining that the point SPx belongs to the first area AR1, for example, the reliability calculator 3 determines that there is gap at the position of the point SPx. Thus, for example, the reliability calculator 3 may detect the gap on the side of the object OB. For example, the reliability calculator 3 may calculate, as the reliability information, information that indicates the position of the detected gap and that the reliability of a gap being present at this position is high (that the reliability of a body that blocks light being present is low). The reliability calculator 3 does not necessarily calculate at least a part of the reliability information described with reference to FIGS. 4A and 4B.

Figure 5A:
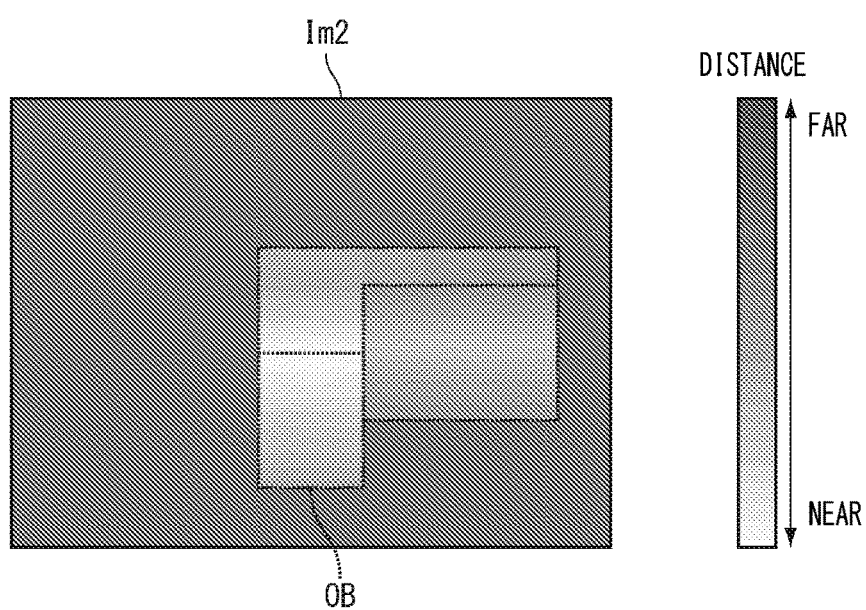
FIGS. 5A to 5C are illustrative diagrams of the reliability information based on a distance according to the first embodiment.
Figure 5B:
Figure 5C:
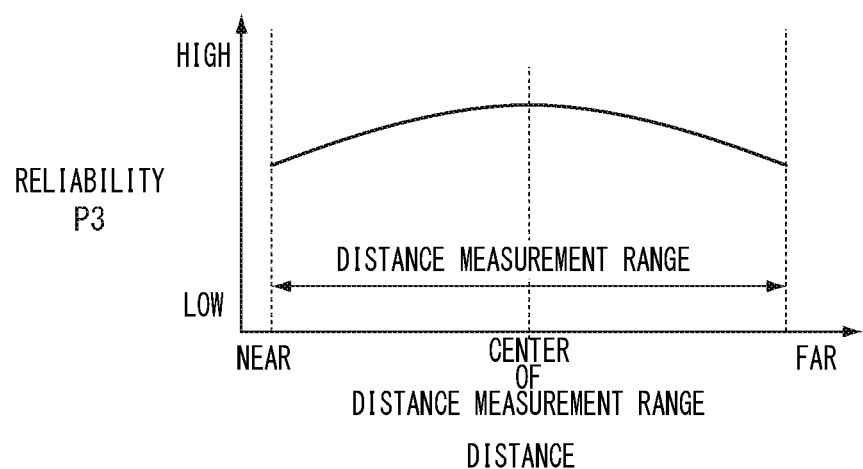

Next, the reliability information based on a distance (depth) detected by the detector 2 (for example, the distance measurer 12) is described. For example, the reliability calculator 3 calculates the reliability information on the basis of the distance detected by the distance measurer 12. FIGS. 5A to 5C are illustrative diagrams of the reliability information based on the distance detected by the distance measurer 12. FIG. 5A is a conceptual diagram of an example of the depth information (a depth image Im2). In FIG. 5A, the object OB is represented by dotted lines, and the distance for each area (for example, one pixel or a plurality of pixels of the depth image Im2) included in the detection area A1 of the detector 2 is represented by gray scale. In the depth image Im2, a part having a higher gray-scale value (closer to white) is closer to the viewpoint Vp, whereas a part having a lower gray-scale value (closer to black) is farther from the viewpoint.

FIG. 5B is a diagram of an example of the relation between the distance and a reliability P3. For example, the distance measurer 12 sometimes reduces its detection result reliability (for example, detection accuracy) as the position is farther from the viewpoint Vp. In such a case, for example, the reliability calculator 3 calculates the reliability P3 of a value having negative correlation with respect to the distance as the reliability information. In FIG. 5B, the reliability P3 decreases as the distance from the viewpoint Vp increases. Information that indicates the relation between the reliability P3 and the distance from the viewpoint Vp (hereinafter, third relation information) is, for example, stored in the memory 5 (refer to FIG. 1B) in advance. For example, the reliability calculator 3 compares, for each area (for example, one pixel or a plurality of pixels) on the depth image Im2 (refer to FIG. 5A), the distance to the viewpoint Vp in the area with the third relation information to calculate the reliability P3 of this area. For example, the reliability calculator 3 calculates, as the reliability information, information in which the position in each area and the reliability P3 are associated with each other (hereinafter, referred to as information on the reliability P3).

FIG. 5C is a diagram of another example of the relation between the distance and the reliability P3. For example, the distance measurer 12 has a certain distance measurement range and sometimes reduces its detection result reliability (for example, detection accuracy) as the distance from the center of the distance measurement range increases. In such a case, for example, the reliability calculator 3 may calculate the reliability information on the basis of deviation between the center of the distance measurement range and the distance from the viewpoint as the reliability information. In FIG. 5C, the reliability P3 is maximized at the center of the distance measurement range and reduced as the distance from the center of the distance measurement range increases. As illustrated in FIG. 5B and FIG. 5C, the relation between the distance and the reliability P3 is, for example, set as appropriate in accordance with the characteristics of the distance measurer 12.

Figure 6A:
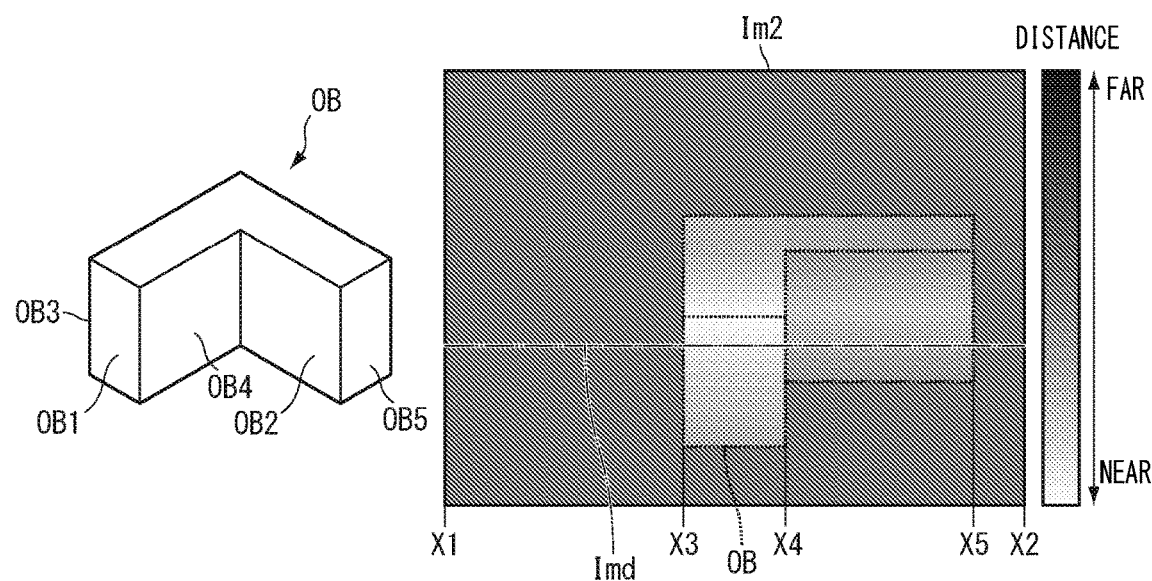
FIGS. 6A to 6D are illustrative diagrams of the reliability information based on distance distribution according to the first embodiment.
Figure 6B:
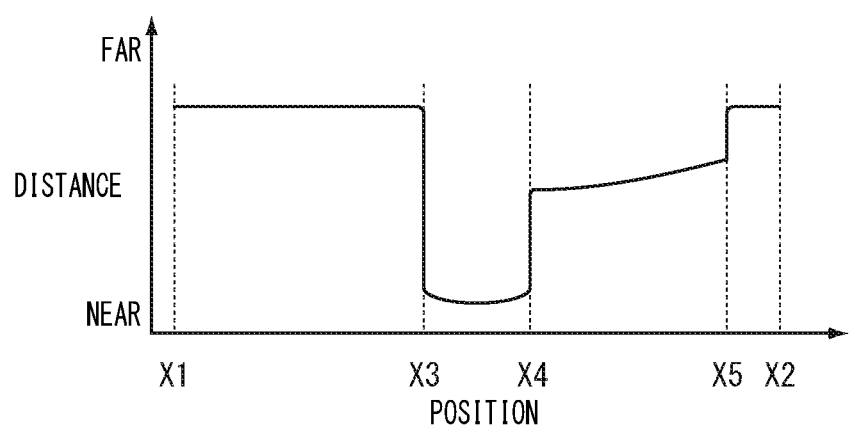
Figure 6C:
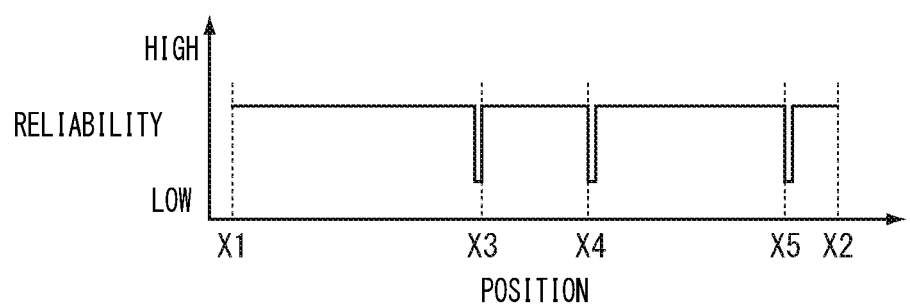

The reliability calculator 3 may calculate the reliability information on the basis of distance distribution detected by the distance measurer 12. FIGS. 6A to 6D are illustrative diagrams of the reliability information based on the distance distribution. FIG. 6A is a conceptual diagram of an example of the depth information (the depth image Im2) and the object OB. In FIGS. 6A to 6C, the symbols X1 to X5 indicate positions in one direction on the depth image Im2. The position X1 is the position of one end of the depth image Im2, and the position X2 is the position of another end of the depth image Im2. The section from the position X1 to the position X3 is a part of the background of the object OB (for example, the floor F and the wall W in FIGS. 4A and 4B). The section from the position X3 to the position X4 is a part of a front face OB1 of the object OB. The section from the position X4 to the position X5 is a part of a face OB2 having a step relative to the front face OB1. The section between the position X5 and the position X2 is a part of the background of the object OB (for example, the floor F and the wall W in FIGS. 4A and 4B). The position X3 is a part on a side face OB3 relative to the front face OB1, and the position X4 is a part on a side face OB4 between the front face OB1 and the face OB2. The position X5 is a part on a side face OB5 relative to the face OB2. The side face OB3, the side face OB4, and the side face OB5 are, for example, faces nearly parallel to a line of sight from the viewpoint Vp and can be low in the detection result reliability.

FIG. 6B is a conceptual diagram of the distance distribution on a line Imd in FIG. 6A. In FIG. 6B, the distance from the viewpoint Vp changes stepwise at the position X3, the position X4, and the position X5. For example, the detection result reliability of the distance measurer 12 is reduced at a position (for example, near a step) at which a change in distance is larger than a threshold. In such a case, for example, the reliability calculator 3 may calculate a reliability corresponding to the change in distance as the reliability information. For example, the reliability calculator 3 may calculate a reliability of a value having negative correlation with respect to the change in distance as the reliability information. For example, the reliability calculator 3 may calculate a reliability that indicates that the detection result reliability of the distance measurer 12 is higher for an area in which the change in distance is relatively small. For example, the reliability calculator 3 may calculate a reliability that indicates that the detection result reliability of the distance measurer 12 is lower for an area in which the change in distance is relatively large.

FIG. 6C is a conceptual diagram of an example of the distribution of a reliability P4 based on the change in distance. This drawing conceptually illustrates the distribution of the reliability P4 corresponding to the distance distribution in FIG. 6B. The change in distance is, for example, an amount corresponding to inclination between a line of sight passing through the viewpoint of the detector 2 and a face on the object OB. For example, when the change in distance is large, the face on the object OB is nearly parallel to the line of sight; when the change in distance is small, the face on the object OB is nearly perpendicular to the line of sight. In FIG. 6C, the reliability P4 is relatively low at positions at which the change in distance is large (for example, the positions X3 and X4 and the position X5). For example, the reliability calculator 3 calculates the change in distance for each area of the depth image Im2 (for example, difference in depth between two adjacent areas) and compares the calculated change with a threshold. For example, when the change in distance is the threshold or less, the reliability calculator 3 determines the reliability P4 of this area to be a high level. When the change in distance is larger than the threshold, the reliability calculator 3 determines the reliability P4 of this area to be a low level.

Figure 6D:
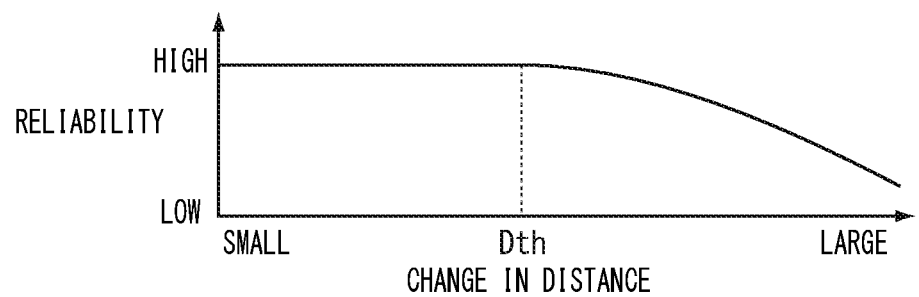

FIG. 6D is a conceptual diagram of an example of the relation between the change in distance and the reliability P4. In FIG. 6D, the reliability P4 is constant in a range in which the change in distance is a threshold Dth or less and decreases in a range in which the change in distance exceeds the threshold Dth. The reliability P4 may change nonlinearly, change linearly, or change discontinuously (for example, stepwise) relative to the change in distance. Information that indicates the relation between the reliability P4 and the change in distance from the viewpoint Vp (hereinafter, fourth relation information) is, for example, stored in the memory 5 (refer to FIG. 1B) in advance. For example, the reliability calculator 3 calculates the change in distance to the viewpoint Vp for each area (for example, one pixel or a plurality of pixels) on the depth image Im2 (refer to FIG. 6A) and compares this change with the fourth relation information to calculate the reliability P4 of each area. For example, the reliability calculator 3 calculates, as the reliability information, information in which the position in each area and the reliability P4 are associated with each other (hereinafter, referred to as information on the reliability P4).

At least one of the information on the reliability P3 and the information on the reliability P4 may be stored in the same file as that for the depth information. For example, the data structure (data format) of this information may be a structure that pairs the reliability (at least one of the reliability P3 and the reliability P4) and the depth for each partial area of the detection area A1. For example, this information may be represented by form that pairs the value of the depth and the reliability for each area (for example, one pixel or a plurality of pixels) of the depth image Im2. At least one of the information on the reliability P3 and the information on the reliability P4 may be stored in a file separate from that for the depth information. For example, at least one of the data structure of the information on the reliability P2 and the data structure of the information on the reliability P3 may be a structure that, corresponding to the data arrangement of the distance of each area in the depth information, arranges the values of the reliabilities of the respective areas.

The reliability calculator 3 does not necessarily calculate at least one of the information on the reliability P3 and the information on the reliability P4. The reliability calculator 3 does not necessarily calculate the reliability information based on the distance detected by the detector 2 (for example, the distance measurer 12). The reliability calculator 3 may calculate a reliability obtained by combining two or more of the reliability P1 to the reliability P4. For example, the reliability calculator 3 performs weighting (the calculation of a weighted average) using two or more of the reliability P1 to the reliability P4 to calculate a reliability. The reliability calculator 3 may calculate at least one of the arithmetic average and the geometrical average of two or more of the reliability P1 to the reliability P4 as a reliability.

Referring back to the description of FIG. 1, the information calculator 4 includes, for example, a digital signal processor (DSP). The information calculator 4 calculates at least one of the shape information and the texture information on the object OB by using the detection result of the detector 2 (for example, the depth information). Although the distance measurer 12 generates the depth information in the above description, the information calculator 4 may generate the depth information on the basis of the depth detected by the distance measurer 12. The information calculator 4 may generate information in which the reliability information calculated by the reliability calculator 3 on the basis of the depth information and the depth information are associated with each other.

For example, the information calculator 4 calculates, as the shape information, the point cloud data including the coordinates of a plurality of points on the object OB on the basis of the detection result of the detector 2. The information calculator 4 calculates the point cloud data by using the detection result of the distance measurer (for example, the depth information) (point cloud data processing). For example, the information calculator 4 calculates the point cloud data by perspective transformation or the like from a distance image (a depth image) indicated by the depth information into a planar image. For example, when the imager 11 and the distance measurer 12 differ in the field of view, the information calculator 4 may transform the detection result of the distance measurer 12 into a result obtained by detecting the object OB from the field of view of the imager 11 by perspective transformation (projective transformation) or the like. For example, the information calculator 4 may perform perspective transformation by using parameters that depend on the positional relation between the field of view of the imager 11 and the field of view of the distance measurer 12 (for example, the position of a viewpoint or the direction of a line of sight).

For example, the information calculator 4 generates the point cloud data by using the reliability information. For example, the information calculator 4 may select an area the reliability of which is relatively high in the depth image and perform perspective transformation from the depth image into the planar image. For example, the information calculator 4 may omit perspective transformation on at least a part of an area the reliability of which is relatively low in the depth image. For example, the information calculator 4 may generate the point cloud data without using information the reliability of which is relatively low in the depth information and in this case is able to reduce load on the processing and to reduce the data amount of the point cloud data to be generated. For example, the information calculator 4 may interpolate the area the reliability of which is relatively low by using the area the reliability of which is relatively high in the depth image and perform perspective transformation from the depth image into the planar image.

For example, the information calculator 4 stores the calculated point cloud data in the memory 5. For example, the information calculator 4 generates information in which the point cloud data and the reliability information are associated with each other. For example, the information calculator 4 calculates information in which three-dimensional point coordinates included in the point cloud data and the reliability of a point on the depth image corresponding to this point are associated with each other. For example, the data structure of this information may be a structure that pairs the three-dimensional point coordinates and the reliability. For example, the information calculator 4 stores information in which the point cloud data and the reliability information are associated with each other in the memory 5.

The information calculator 4 may generate the point cloud data without using the reliability information. The reliability calculator 3 may calculate the reliability information on the information on points included in the point cloud data (the reliability information on the point cloud data) by using the point cloud data generated by the information calculator 4. For example, the reliability calculator 3 may calculate the reliability information on the basis of distance information between certain two points included in the point cloud data. For example, the reliability calculator 3 may select two adjacent points from the point cloud data and compare the distance between the two points with a threshold to calculate the reliability information. The reliability calculator 3 may calculate the reliability information on the basis of the spatial frequency information on a plurality of points included in the point cloud data (for example, the density of the spatial distribution of the points). The reliability calculator 3 may calculate the reliability information on the basis of vector information connecting two points included in the point cloud data. For example, the reliability calculator 3 may select two adjacent points from the point cloud data and use a vector connecting these two points and the positional information on the detection device 1 to calculate the reliability information. The positional information on the detection device 1 includes, for example, the orientation of the viewpoint Vp (a detection direction, a line of sight, or the direction of the optical axis of the optical system). For example, the reliability calculator 3 may calculate the reliability information in accordance with the angle between a vector connecting two points included in the point cloud data and the orientation of the viewpoint Vp. For example, the reliability calculator 3 may provide a relatively low reliability of at least one of the starting point and the ending point of the vector when the angle between the vector and the orientation of the viewpoint Vp is close to 0° or 180°. For example, the reliability calculator 3 may provide a relatively high reliability when the angle between the vector and the orientation of the viewpoint Vp is close to 90° or 270°.

The information for use in the calculation of the reliability information by the reliability calculator 3 may be one or two or more of the distance information, the spatial frequency information, the vector information, and the positional information on the detection device 1. The point cloud data for use in the calculation of the reliability information by the reliability calculator 3 may be one generated by the information calculator 4 by using the reliability information or one generated by the information calculator 4 without using the reliability information. The reliability calculator 3 may store the reliability information calculated by using the point cloud data in the memory 5.

The information calculator 4 generates, as the shape information, the surface information including the coordinates of a plurality of points on the object OB and link information among the points on the basis of the detection result of the detector 2. Examples of the surface information include polygon data, vector data, and draw data. The link information includes, for example, information in which the points on both ends of a line corresponding to a ridge line (for example, an edge) of the object OB are associated with each other and information in which a plurality of lines corresponding to the contour of a surface of the object OB are associated with each other. For example, the information calculator 4 estimates a surface between a point selected from a plurality of points included in the point cloud data and a nearby point thereof and transforms the point cloud data into polygon data having plane information between the points (surface processing). For example, the information calculator 4 transforms the point cloud data into the polygon data by an algorithm using least square approximation. For example, for this algorithm, an algorithm disclosed in a point cloud processing library may be used.

For example, the information calculator 4 generates the surface information by using the reliability information. For example, when estimating a surface between a point selected from a plurality of points included in the point cloud data and a nearby point thereof, the information calculator 4 selects the nearby point with the reliability added. For example, the information calculator 4 selects a point the reliability of which is relatively high as the nearby point. For example, the information calculator 4 may generate the surface information without using information the reliability of which is relatively low in the point cloud data and in this case is able to reduce load on the processing and to reduce the data amount of the surface information to be generated. When the reliability of the nearby point is lower than a threshold, the information calculator 4 may perform interpolation using a point the reliability of which is relatively high among points therearound.

For example, the information calculator 4 generates information in which the surface information and the reliability information are associated with each other. For example, the information calculator 4 generates information in which information on a line (or a surface) included in the surface information and information on the reliability of a point of the point cloud data corresponding to this line (or the surface) are associated with each other. For example, this information may be stored as attribution information on an element included in the surface information (for example, a line or a surface). For example, the information calculator 4 stores the information in which the surface information and the reliability information are associated with each other in the memory 5.

The information calculator 4 does not necessarily use the reliability information when generating the surface information. For example, the information calculator 4 may generate the point cloud data by using the reliability information and does not necessarily use the reliability information when generating the surface information on the basis of this point cloud data. The reliability calculator 3 may calculate the reliability information by using the surface information generated by the information calculator 4. For example, the surface information may include information on a line (a graph) connecting two points, and the reliability calculator 3 may calculate the reliability information on the information on the line. For example, similarly to the calculation of the reliability information using the point cloud data, the reliability calculator 3 may calculate the reliability information on the information on the line by using at least one of the distance information, the vector information, and the positional information on the detection device 1.

For example, the surface information may include information on a surface of an object surrounded by three or more lines, and the information calculator 4 may generate the information on the surface by using the reliability information on the information on the line. For example, a line the reliability of which is relatively high among a plurality of candidates of outer peripheral lines of a surface may be employed as the outer peripheral line of the surface. For example, the surface information may include information on a surface surrounded by three or more lines, and the reliability calculator 3 may calculate the reliability information on the information on the surface. For example, the reliability calculator 3 may calculate the reliability information on the information on the surface by an arithmetic average, a geometrical average, or a weighted average using the reliability information on the information on the line corresponding to the outer peripheral lines of the surface. The reliability calculator 3 may calculate the reliability information by using the normal direction of the surface and the positional information on the detection device 1 (for example, the orientation of the viewpoint Vp). For example, the reliability calculator 3 may calculate the reliability information in accordance with the angle between the normal vector of the surface and the orientation of the viewpoint Vp. For example, the reliability calculator 3 may provide a relatively low reliability of the surface when the angle between the normal vector of the surface and the orientation of the viewpoint Vp is close to 0° or 180°. For example, the reliability calculator 3 may provide a relatively high reliability of the surface when the angle between the normal vector of the surface and the orientation of the viewpoint Vp is close to 90° or 270°.

The reliability calculator 3 may calculate the reliability information on the point cloud data by using the surface information generated by the information calculator 4. For example, the reliability calculator 3 may calculate the reliability information on the basis of, for the information on the point used for the information on the surface, the distance between the surface and the point. For example, when the distance of a point, among the points belonging to the surface, from the surface is a threshold or more, the reliability calculator 3 may provide a lower reliability of this point than that when the distance is less than the threshold. The reliability calculator 3 may calculate the reliability information on the point cloud data by using the surface information and recalculate at least a part of the surface information (for example, the information on the line or the information on the surface) by using the reliability information. The reliability calculator 3 may store the reliability information calculated by using the surface information in the memory 5.

The information calculator 4 calculates the texture information by, for example, inverse rendering. The texture information includes, for example, information on at least one item of pattern information representing a pattern of the surface of the object OB, light source information on light applied to the object OB, and optical characteristics information representing optical characteristics (for example, reflectivity, scattering rate, and transmittance) of the surface of the object OB. The light source information includes, for example, information on at least one item of the position of a light source, the direction of light applied from the light source to the object, the wavelength of light applied from the light source, and the type of the light source.

For example, the information calculator 4 calculates the light source information by using a model that assumes Lambertian reflectance or a model including Albedo estimation. For example, the information calculator 4 estimates, among pixel values of respective pixels in an image taken by the imager 11, a component derived from light diffused by the object OB and a component regularly reflected by the object OB. For example, the information calculator 4 uses the result of estimating the component regularly reflected by the object OB and the shape information to calculate the direction in which light enters the object OB from the light source. For example, the information calculator 4 uses the calculated light source information and shape information to estimate reflection characteristics of the object OB and calculates the optical characteristics information including the estimation result of the reflection characteristics. For example, the information calculator 4 uses the calculated light source information and optical characteristics information to remove the influence of illumination light from visible light image data and calculates pattern information.

For example, the reliability calculator 3 may calculate the reliability information on the texture information by using image data on which the texture information is based. For example, the reliability calculator 3 may calculate the reliability information by using at least one of the luminance (gray-scale value) of R, G, and B of each pixel included in the image data and the spatial frequency information on a texture calculated from the image data. The reliability calculator 3 may calculate the reliability information by using at least a part of the characteristics (for example, an illumination field or aberration) of an optical system for use in the acquisition of the image data, the optical characteristics of the object (for example, reflectance, transmittance, or absorbance), and information on a light source of light with which the object is irradiated. For example, the information calculator 4 calculates the texture information by using the reliability information. For example, the information calculator 4 may calculate the texture information by selectively using an area the reliability of which is relatively high in the detection result (the taken image) of the detector 2 (for example, the imager 11). For example, the information calculator 4 does not necessarily use an area the reliability of which is relatively low in the taken image by the imager 11 for the calculation of the texture information and in this case is able to reduce load on the processing and to reduce the data amount of the texture information to be generated. The information calculator 4 may interpolate the information on the area the reliability of which is relatively low by using the information on the area the reliability of which is relatively high to calculate the texture information.

For example, the reliability calculator 3 calculates the reliability information for each area (for example, the points in the point cloud data or the elements of the surface information) of the object OB. The reliability information may include, for example, information with the detection result of the detector 2 weighted in order to calculate the shape information or the texture information. For example, the reliability information may include information with the detection result of the detector 2 or information generated from the detection result weighted as the information for use in the calculation of the shape information or the texture information. A coefficient for use in this weighting may be a value corresponding to the reliability included in the reliability information acquired before the processing of weighting.

For example, the information calculator 4 associates the reliability information calculated for each area of the object OB with at least one of the shape information and the texture information. For example, the information calculator 4 generates data (for example, (Xi, Yi, Zi, Pi)) that pairs the coordinates (for example, (Xi, Yi, Zi) of each point of the point cloud data and the reliability information on this point (for example, the reliability P=Pi). For example, the information calculator 4 may associate each point of the point cloud data and the reliability information with each other by associating an identifier (for example, an ID or a number) of each point of the point cloud data and the reliability information on this point with each other. For example, the information calculator 4 may generate data with the identifier of this point added to the reliability information on each point of the point cloud data. The information calculator 4 may generate data with an identifier (an ID or a number) of the reliability information on this point added to the coordinates of each point of the point cloud data.

For example, the information calculator 4 generates data that pairs the element (for example, a line, a surface, each area of a mesh, or a voxel) of the surface information and the reliability information on this element. For example, the information calculator 4 generates data that pairs an element (for example, point link information) defined in the surface information and the reliability information on this element. For example, the information calculator 4 generates data that pairs the texture information calculated for each area (for example, one pixel or a plurality of pixels of the taken image) of the object OB and the reliability information on this area.

For example, the information calculator 4 may associate each element of the surface information and the reliability information with each other by associating an identifier (for example, an ID or a number) of each element of the surface information and the reliability information on this element with each other. For example, the information calculator 4 may generate data with the identifier of this element added to the reliability information on the element of the surface information. The information calculator 4 may generate data with an identifier (for example, an ID or a number) of the reliability information on this point added to information (for example, point link information) of the element of the surface information. For example, the information calculator 4 generates model information with header information (for example, identification information such as a number or a code) attached to information including at least one of the shape information and the texture information. This header information includes at least one of the identification information, the position (the positional information) of the detection device 1, imaging timing by the imager 11, imaging time by the imager 11, the optical characteristics information on the object OB, and imaging environmental information (for example, light source information or irradiating conditions for the object OB and the like). Thus, the information calculator 4 generates the model information having the header information on the basis of certain data format.

The memory 5 is, for example, a non-volatile memory such as a USB memory or a memory card and stores therein various kinds of information. The memory 5 may include a storage device incorporated in the detection device 1 and may include a port to which a storage device releasable from the detection device 1 is able to be connected.

For example, the controller 7 controls each component in the detection device 1 by an instruction (a control signal) from a user or an external device. For example, the controller 7 causes the detector 2 to execute the above-mentioned detection processing. This detection processing includes, for example, imaging processing by the imager 11 and distance detection processing by the distance measurer 12. For example, the controller 7 stores at least a part of the detection result of the detector 2 in the memory 5. For example, the controller 7 causes the reliability calculator 3 to calculate the model information. For example, the controller 7 stores at least a part of the reliability information calculated by the reliability calculator 3 in the memory 5. For example, the controller causes the information calculator 4 to calculate the model information. For example, the controller 7 stores at least a part of the model information calculated by the information calculator 4 in the memory 5.

For example, the communicator 6 includes at least one of an I/O port such as a USB port and a communication device that performs wireless communication by radio waves or infrared rays. The communicator 6 is controlled by the controller 7 to read information stored in the memory 5 and transmit the read information to an external device. For example, the communicator 6 transmits at least a part of the calculation result of the reliability calculator 3 (for example, the reliability information) and the calculation result of the information calculator 4 (for example, the model information) to the external device (for example, an information processing device 51 illustrated in FIG. 9 and the like below). For example, the communicator 6 receives information including an instruction from the external device. The communicator 6 is able to store the received information in the memory 5 and to supply the received information to the controller 7.

For example, the detection device 1 is able to output at least a part of the model information to a digital device that is able to input and output digital information such as barcodes and two-dimensional codes. This digital device is able to display or print digital information including at least a part of the model information on a display or media such as paper. A reader device including a reader (for example, an optical reader) that is able to read the displayed or printed digital information is able to input the digital information to a storage area in the device via the reader. The reader device may further include a rendering processor described below. The detection system 50 may include the digital device and the reader device including the reader. The detection device 1 may include the digital device and the reader device. When the detection device 1 includes the digital device, the communicator 6 may transmit at least a part of the model information to the digital device. The digital device may generate digital information on the basis of the received model information and output this digital information to media such as paper.

Figure 7:
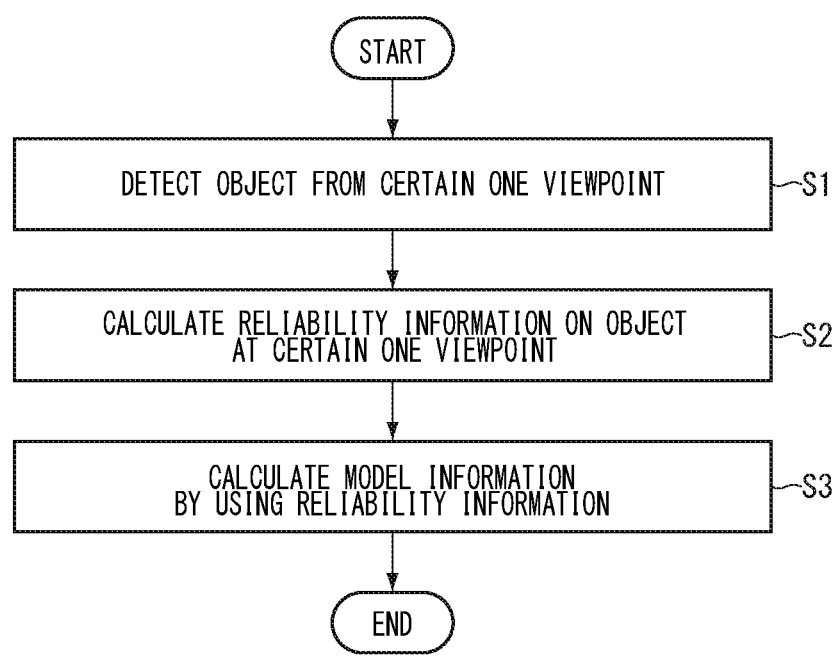
FIG. 7 is a flowchart of an example of a method of detection according to the first embodiment.

Next, on the basis of the operation of the detection device 1 with the configuration described above, a method of detection according to the first embodiment is described. FIG. 7 is a flowchart of an example of the method of detection according to the first embodiment. In Step S1, the detector 2 detects the object OB from certain one viewpoint (a single viewpoint). For example, the imager 11 of the detector 2 images the object OB from the viewpoint Vp. For example, the distance measurer 12 of the detector 2 measures the distance from the viewpoint Vp to a point on the surface of the object OB. In Step S2, the reliability calculator 3 calculates the reliability information on the object OB at the certain one viewpoint. For example, the reliability calculator 3 calculates the reliability information by using at least a part of the detection result (for example, the taken image) of the imager 11 and the detection result (for example, the depth information) of the distance measurer 12. For example, the reliability calculator 3 calculates at least a part of the reliability information described with reference to FIGS. 3A to 3C to FIGS. 6A to 6D. In Step S3, the information calculator 4 calculates the model information including at least one of the shape information and the texture information on the object OB at the viewpoint Vp by using the detection result of the detector 2 and the reliability information.

Figure 8:
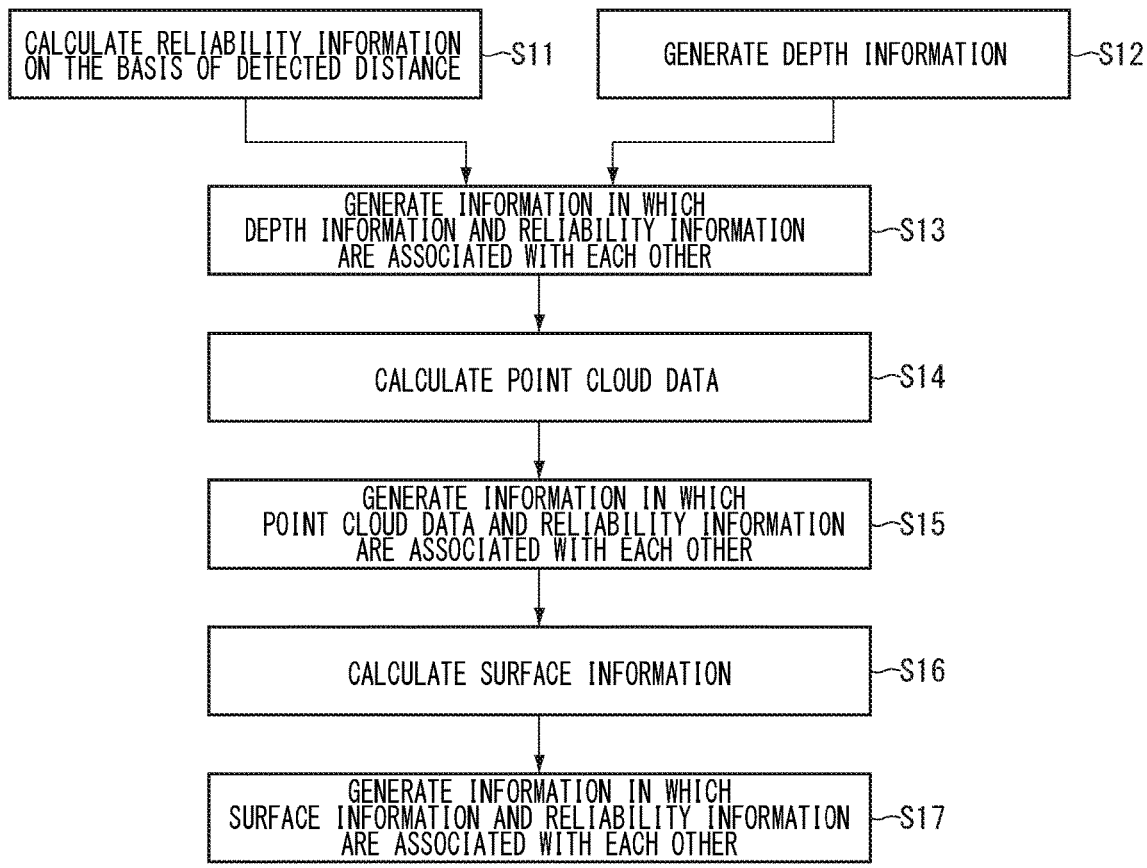
FIG. 8 is a flowchart of an example of the processing in FIG. 7.

FIG. 8 is a flowchart of an example of the pieces of processing in Step S2 and Step S3 in FIG. 7. In the first embodiment, prior to the calculation of the reliability information, depth is detected by, for example, the distance measurer 12. In Step S12, the reliability calculator 3 calculates the reliability information on the basis of the distance (the depth) detected by the distance measurer 12 as illustrated in, for example, FIGS. 4A and 4B to FIGS. 6A to 6D. In Step S13, the information calculator calculates the information in which the reliability information calculated in Step S11 and the depth information generated in Step S12 are associated with each other. In Step S14, the information calculator 4 calculates the point cloud data by using the information calculated in Step S13. In Step S15, the information calculator 4 generates the information in which the point cloud data and the reliability information are associated with each other. In Step S16, the information calculator 4 calculates the surface information by using the information calculated in Step S15. In Step S17, the information calculator 4 calculates the information in which the surface information and the reliability information are associated with each other.

Figure 9:
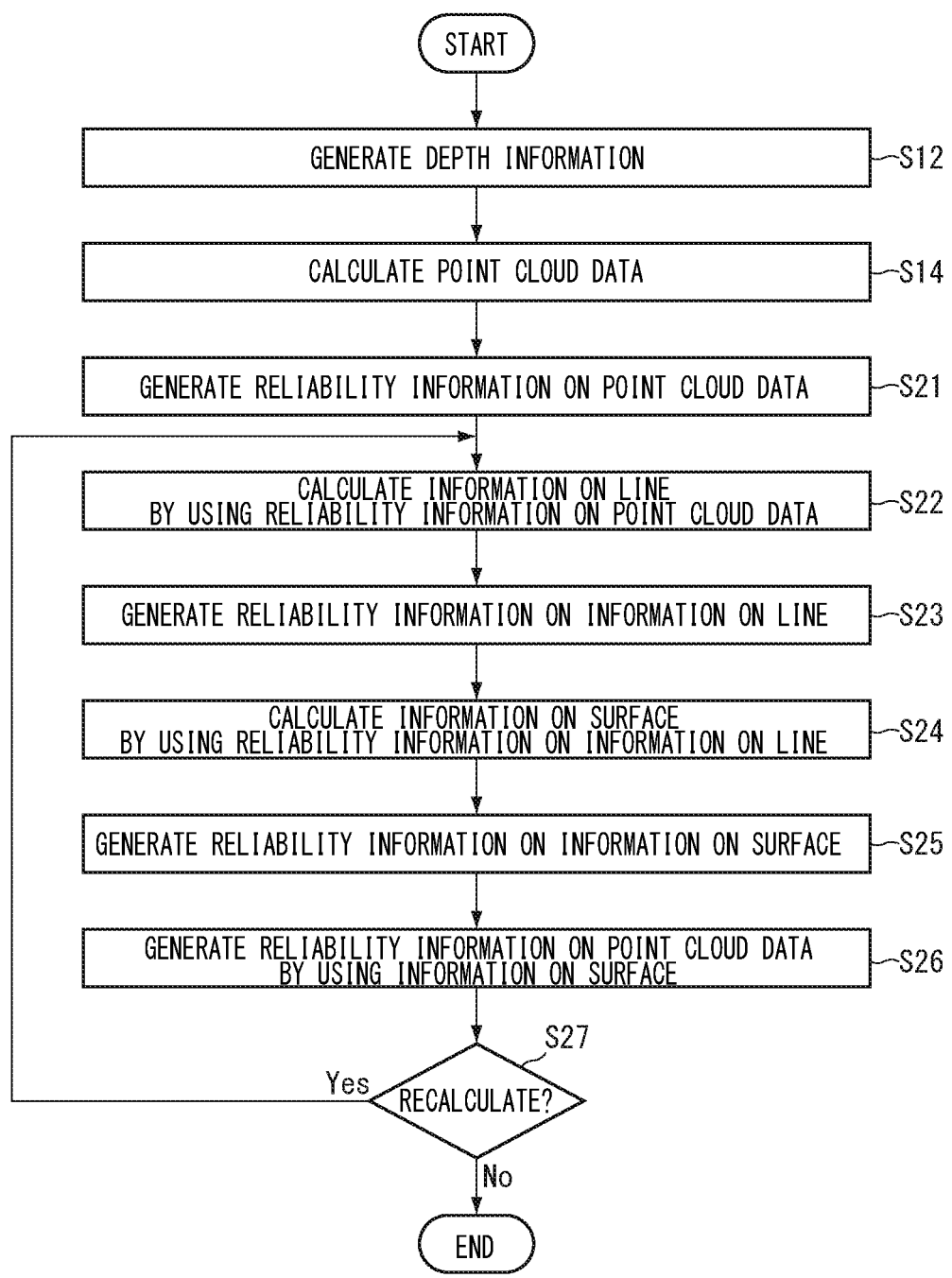
FIG. 9 is a flowchart of another example of the processing in FIG. 7.

FIG. 9 is a flowchart of another example of the pieces of processing in Step S2 and Step S3 in FIG. 7. In FIG. 9, processing similar to that in FIG. 8 is denoted by the same reference symbol, and a description thereof is omitted or simplified as appropriate. In Step S11, the detection device 1 (for example, the controller 18) generates the depth information. In Step S14, the information calculator calculates the point cloud data. In Step S21, the reliability calculator 3 generates the reliability information on the point cloud data calculated by the information calculator 4 in Step S14.

For example, the reliability calculator 3 stores the generated reliability information on the point cloud data in the memory 5. In Step S22, the information calculator 4 calculates the information on the line in the surface information by using the point cloud data and the reliability information on the point cloud data generated by the reliability calculator 3 in Step S21. In Step S23, the reliability calculator 3 generates the reliability information on the information on the line calculated by the information calculator 4 in Step S22. For example, the reliability calculator 3 stores the generated reliability information on the information on the line in the memory 5. In Step S24, the information calculator 4 calculates the information on the surface in the surface information by using the information on the line and the reliability information on the information on the line generated by the reliability calculator 3 in Step S23. In Step S25, the reliability calculator 3 generates the reliability information on the information on the surface calculated by the information calculator 4 in Step S24. For example, the reliability calculator 3 stores the generated reliability information on the information on the surface in the memory 5.

In Step S26, the reliability calculator 3 calculates the reliability information on the point cloud data by using the information on the surface calculated by the information calculator 4 in Step S24. The reliability calculator 3 may update the reliability information on the point cloud data generated in Step S21 to the reliability information on the point cloud data generated in Step S26. The reliability calculator 3 may integrate the reliability information on the point cloud data generated in Step S21 and the reliability information on the point cloud data generated in Step S26 by an arithmetic average, a geometrical average, or a weighted average. The reliability calculator 3 may store the reliability information on the point cloud data generated in Step S26 in the memory 5 separately from the reliability information on the point cloud data generated in Step S21. In Step S27, the detection device 1 (for example, the information calculator 4) determines whether the surface information is recalculated. For example, the information calculator 4 performs the determination processing in Step S27 in accordance with setting information that sets whether the recalculation is performed in advance. If it is determined that the surface information is recalculated (Yes in Step S27), the information calculator 4 returns the process to Step S22 and repeats the pieces of processing in Step S22 and the following steps by using at least a part of the reliability information generated at the previous pieces of processing in Step S22 to Step S26. If it is determined that the surface information is not recalculated (No in Step S27), the information calculator 4 ends the series of processing.

The reliability calculator 3 does not necessarily perform at least one generation processing of the generation processing of the reliability information on the point cloud data in Step S21, the generation processing of the reliability information on the information on the line in Step S23, the generation of the reliability information on the information on the surface in Step S25, and the generation processing of the reliability information on the point cloud data in Step S26. In this case, the information calculator 4 may generate at least a part of the surface information (for example, the information on the line or the information on the surface) without using the reliability information on an item for which the generation processing has not been performed. The information calculator 4 may generate the surface information (for example, the information on the line or the information on the surface) without using the reliability information on an item for which the generation processing has been performed. In this case, the reliability information for which the generation processing has been performed may be used for processing other than the calculation processing of the surface information, for example, processing using the surface information (for example, rendering processing). The information calculator 4 does not necessarily perform the processing in Step S27 and does not necessarily perform the recalculation of the surface information using at least a part of the reliability information.

In the embodiment, the detection device 1 includes, for example, a computer (for example, a microcomputer). This computer reads a processing program stored in the memory 5 and executes various kinds of processing in accordance with this processing program. For example, this processing program processes a detection result obtained by optically detecting the object OB from certain one viewpoint (for example, the viewpoint Vp) by the detector 2. For example, this processing program causes the computer to execute calculating the reliability information on the object OB at the certain one viewpoint (for example, the viewpoint Vp) and generating at least one of the shape information and the texture information on the object OB at the certain one viewpoint (for example, the viewpoint Vp) by using the detection result of the detector 2 and the reliability information. This processing program may be recorded and provided in a computer-readable recording medium.

Second Embodiment

Figure 10:
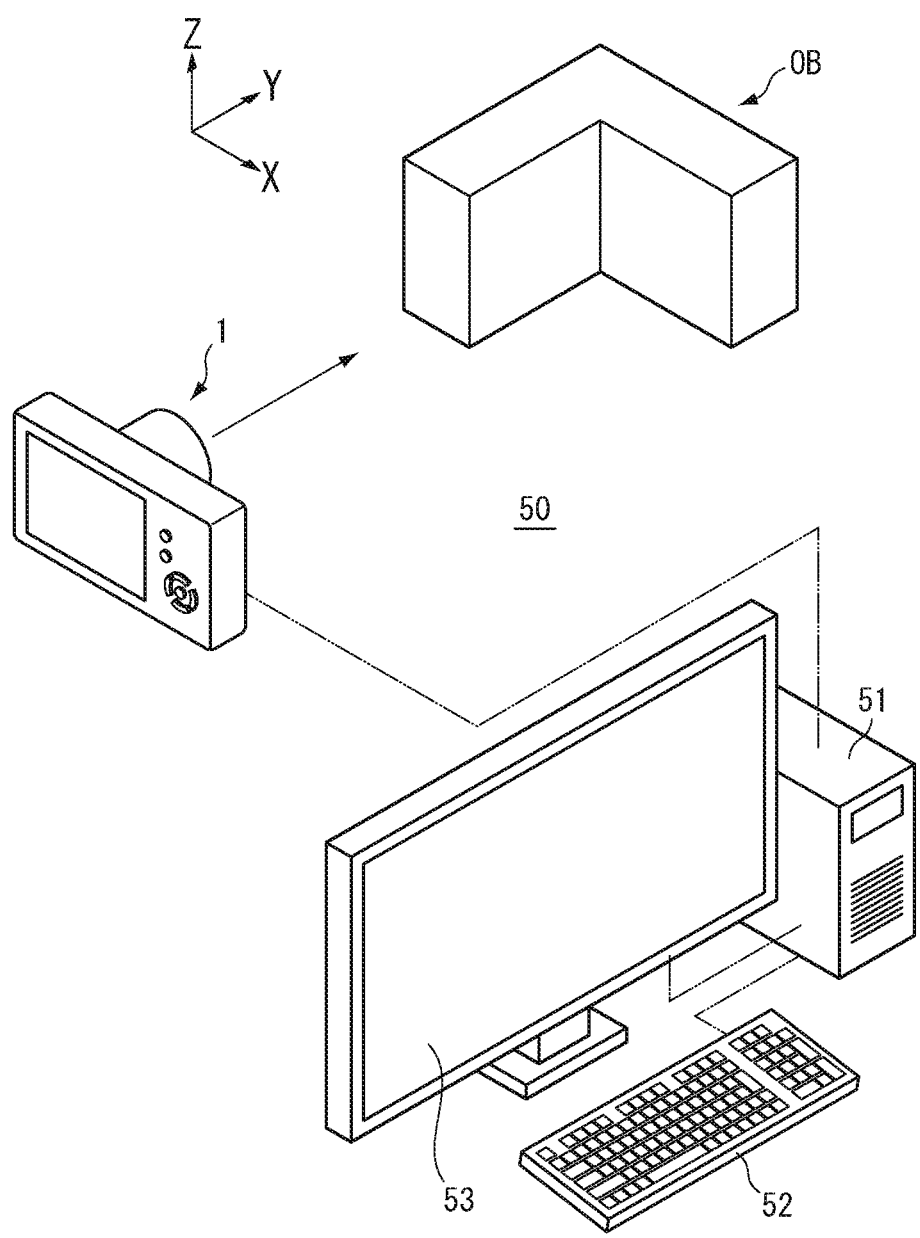
FIG. 10 is a diagram of a detection system according to a second embodiment.

A second embodiment is described. In the second embodiment, the same configurations as those in the above-mentioned embodiment are denoted by the same reference symbols, and descriptions thereof are omitted or simplified. FIG. 10 is a diagram of an example of the detection system according to the second embodiment. The detection system 50 includes the detection device 1 and the information processing device 51 that processes information output from the detection device 1. The information processing device 51 includes, for example, an input device 52 and a display device 53.

The information processing device 51 acquires information from the detection device 1 through communication with the detection device 1. For example, the information processing device 51 executes the rendering processing by using the information (for example, the model information or the reliability information) acquired from the detection device 1. For example, on the basis of setting information on a viewpoint input to the input device 52 by the user, the information processing device 51 calculates data on an estimated image obtained by viewing the object OB from this viewpoint. For example, the information processing device 51 supplies the data on the estimated image to the display device 53 and displays the estimated image on the display device 53.

The input device 52 includes, for example, at least one of a keyboard, a mouse, a touch panel, a sensor such as an acceleration sensor, a voice input machine, and a touch pen. The input device 52 is connected to the information processing device 51. For example, the input device 52 receives input of information from the user and supplies the input information to the information processing device 51. The display device 53 includes, for example, a liquid crystal display or a touch panel display and is connected to the information processing device 51. For example, the display device 53 displays an image (for example, an estimated image by the rendering processing) by image data supplied from the information processing device 51.

Figure 11:
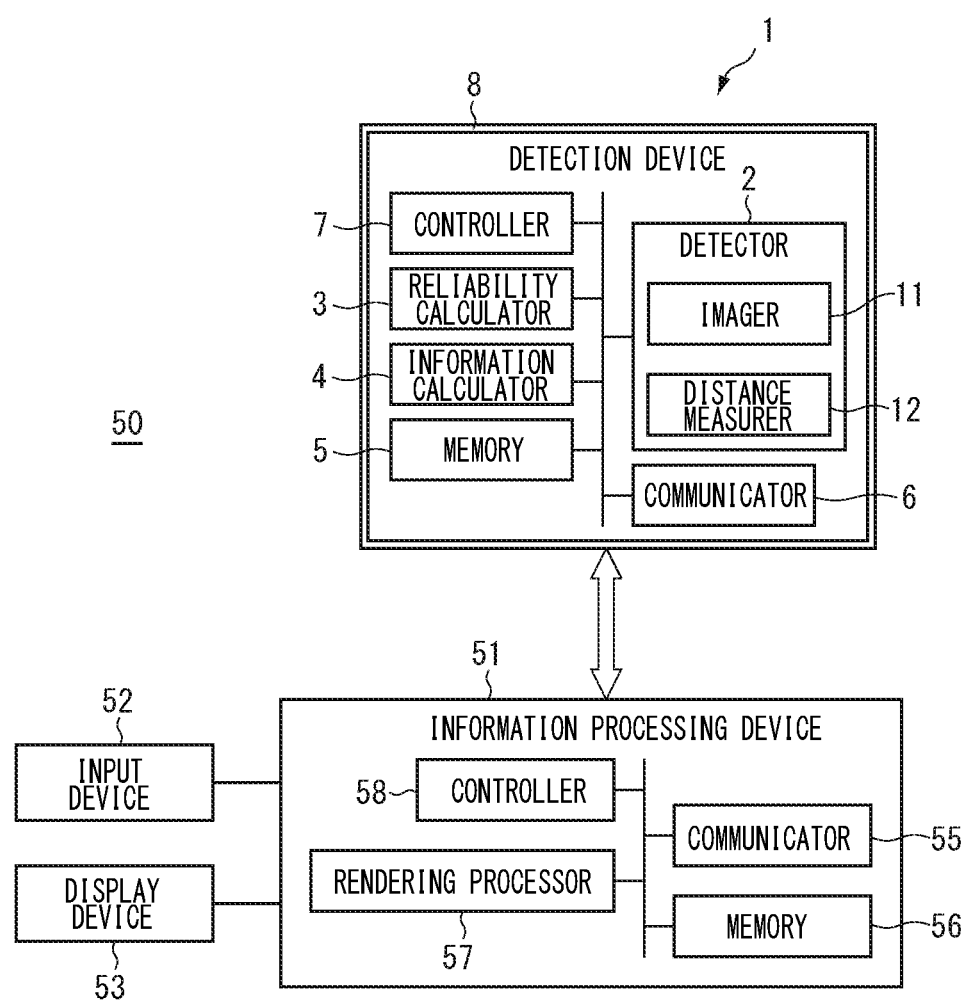
FIG. 11 is block diagram of the detection system according to the second embodiment.

FIG. 11 is a block diagram illustrating an example of the detecting system 50 according to the second embodiment. The information processing device 51 includes a communicator 55, a memory 56, a rendering processor 57, and a controller 58. For example, the communicator 55 includes at least one of a USB port, a network card, or a communication device that performs wireless communication by radio waves or infrared rays. The communicator 55 is communicable with the communicator 6 in the detection device 1.

For example, the memory 56 includes a removable storage medium such as a USB memory or an external or built-in large-capacity storage device such as a hard disk. For example, the memory 56 stores therein data on at least a part of information received via the communicator 55, an imaging control program for controlling the detection device 1, and a processing program for executing each processing in the information processing device 51.

The rendering processor 57 includes, for example, a graphics processing unit (GPU). The rendering processor 57 may have an aspect in which a CPU and a memory execute each processing in accordance with an image processing program. For example, the rendering processor 57 executes at least one of drawing processing, texture mapping processing, or shading processing.

In the drawing processing, for example, the rendering processor 57 is able to calculate an estimated image (for example, a reconstructed image) in which the shape defined by shape information in model information is viewed from a freely selected viewpoint. In the following description, the shape indicated by shape information is referred to as "model shape". For example, the rendering processor 57 is able to reconstruct a model shape (for example, an estimated image) from model information (for example, shape information) through the drawing processing. For example, the rendering processor 57 stores data on the calculated estimated image in the memory 56. In the texture mapping processing, for example, the rendering processor 57 is able to calculate an estimated image obtained by attaching an image indicated by the texture information in the model information to the surface of the object on the estimated image. The rendering processor 57 is also able to calculate an estimated image obtained by attaching another texture than the object OB on the surface of the object on the estimated image. In the shading processing, for example, the rendering processor 57 is able to calculate an estimated image in which the shade formed by a light source indicated by the light source information in the model information is added to the object on the estimated image. In the shading processing, for example, the rendering processor 57 is able to calculate an estimated image in which the shade formed by a freely selected light source is added to the object on the estimated image.

For example, the rendering processor 57 performs the rendering processing by using the reliability information generated by the detection device 1. For example, the rendering processor 57 may perform rendering process with the resolution of an area the reliability of which is relatively high in the model shape higher than the resolution of an area the reliability of which is relatively low. For example, the rendering processor 57 may generate the estimate image with the resolution of the area the reliability of which is relatively low in the model shape reduced (for example, blurred). For example, the rendering processor 57 may omit or simplify the rendering processing for the area the reliability of which is relatively low in the model shape. For example, the rendering processor 57 may perform the rendering processing by interpolating the area the reliability of which is relatively low in the model shape by using the area the reliability of which is relatively high.

For example, the controller 58 controls each component in the information processing device 51, the detection device 1, the input device 52, and the display device 53. For example, the controller 58 controls the communicator 55 to transmit an instruction (a control signal) and setting information to the detection device 1. For example, the controller 58 stores information received by the communicator 55 from the detection device 1 in the memory 56. For example, the controller 58 controls the rendering processor 57 to execute the rendering processing.

The detection device 50 does not necessarily include the input device 52. For example, to the detection device 50, various kinds of instructions and information may be input via the communicator 6. The detection device 50 does not necessarily include the display device 53. For example, the detection device 50 may output the data on the estimated image generated by the rendering processing to an external display device, and this display device may display the estimated image.

Third Embodiment

Figure 12:
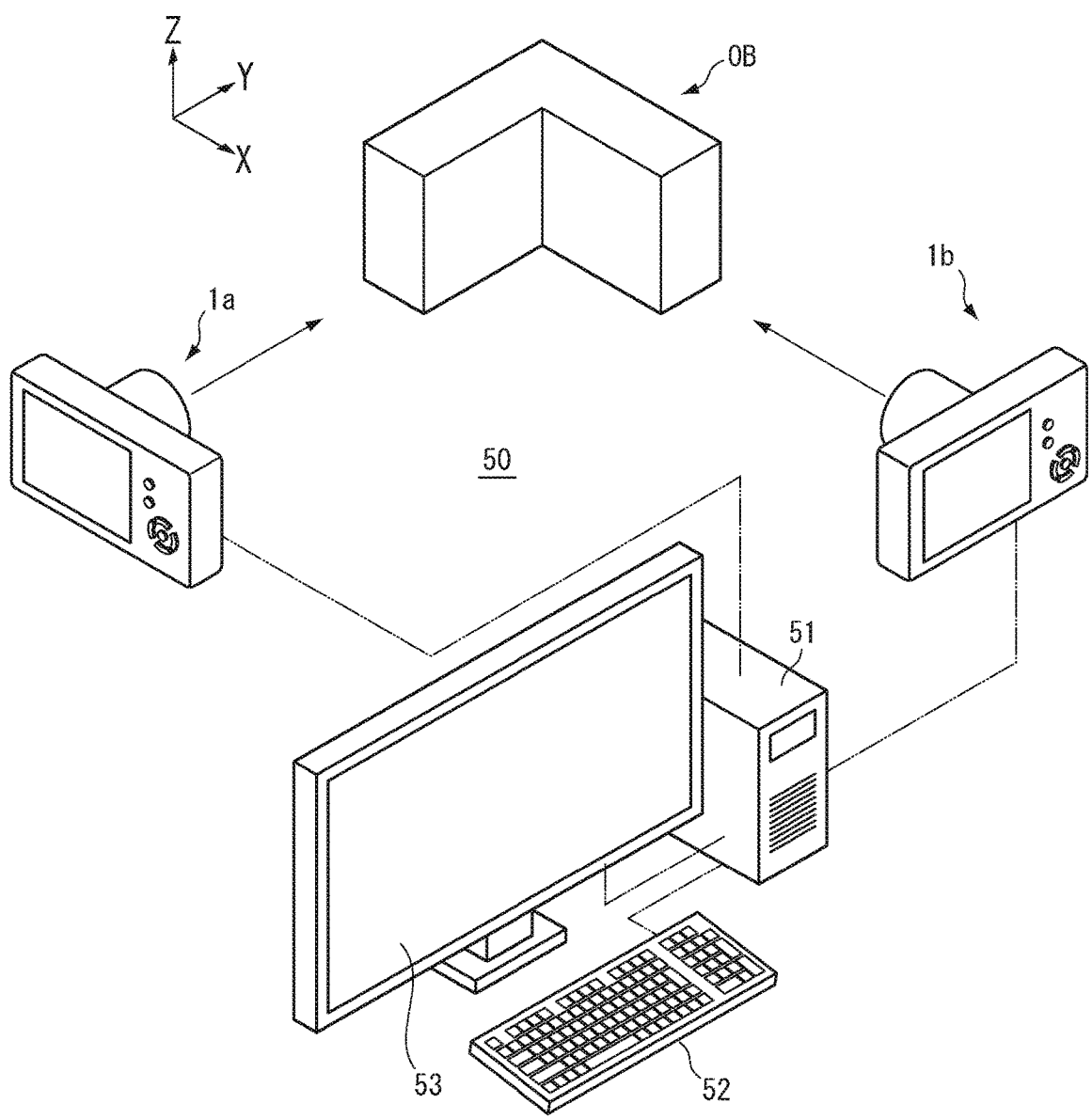
FIG. 12 is a diagram of a detection system according to a third embodiment.

A third embodiment is described. In the third embodiment, the same configurations as those in the above-mentioned embodiment are denoted by the same reference symbols, and descriptions thereof are omitted or simplified. FIG. 12 is a diagram of the detection system 50 according to the third embodiment. The detection system 50 includes a plurality of detection devices (a first detection device 1a and a second detection device 1b) and the information processing device 51 that processes information output from a plurality of detection devices.

The information processing device 51 acquires information (for example, the model information or the reliability information) from the first detection device 1a arranged at a position of a first viewpoint relative to the object OB through communication with the first detection device 1a. The information processing device 51 acquires information (for example, the model information or the reliability information) from the second detection device 1b through communication with the second detection device 1b arranged at a position of a second viewpoint relative to the object OB. The information processing device 51 performs information processing by using the information acquired from the first detection device 1a that detects the object OB from the first viewpoint and the information acquired from the second detection device 1b that detects the object OB from the second viewpoint. For example, the first detection device 1a and the second detection device 1b each supply model information representing the object OB viewed from the viewpoint (one viewpoint, a single viewpoint, or one direction) of each device to the information processing device 51. The information processing device 51 performs model integration processing that integrates first model information that represents the object OB viewed from the viewpoint of the first detection device 1a (the first viewpoint) and second model information that represents the object OB viewed from the viewpoint of the second detection device 1b (the second viewpoint that is different from the first viewpoint).

Figure 13:
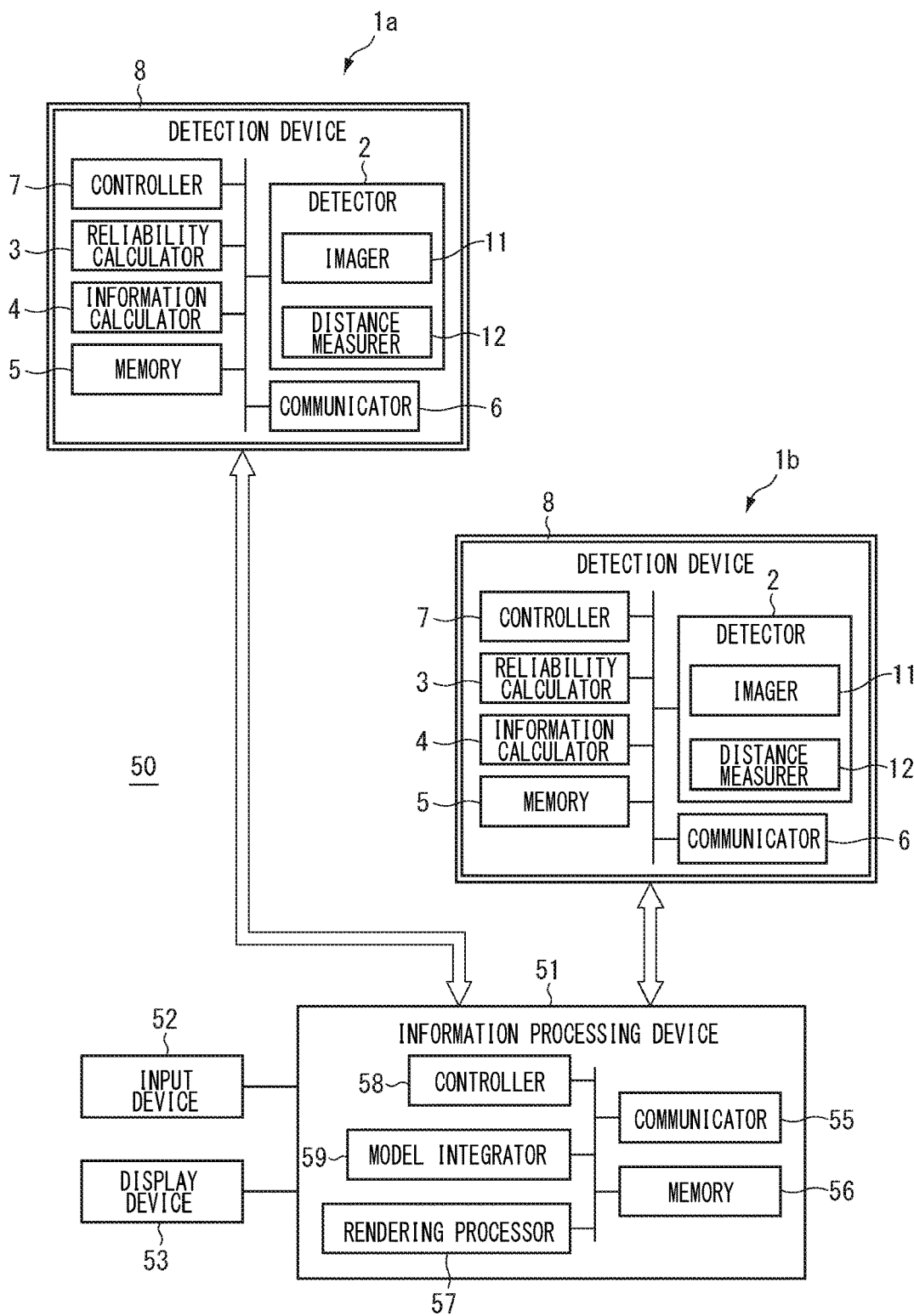
FIG. 13 is a block diagram of the detection system according to the third embodiment.

FIG. 13 is a block diagram of the detection system 50 according to the third embodiment. The first detection device 1a the second detection device 1b each have a configuration similar to that of the detection device 1 illustrated in, for example, FIG. 1. The information processing device 51 includes a receiver (a communicator 55). The communicator 55 receives the first model information on the object OB and the second model information on the object OB. The first model information includes at least one of the shape information and the texture information on the object at one viewpoint (for example, a viewpoint Vp1 illustrated in FIG. 14 below). For example, the first model information is calculated by the first detection device 1a by using a first detection result and first reliability information by the first detection device 1a; the communicator 55 receives the first model information from the first detection device 1a. The second model information include at least one of the shape information and the texture information on the object at a viewpoint that is different from the one viewpoint (for example, a viewpoint Vp2 illustrated in FIG. 14 below). For example, the second model information is calculated by the second detection device 1b by using a second detection result and second reliability information by the second detection device 1b; the communicator 55 receives the second model information from the second detection device 1b.

The information processing device 51 includes a model integrator 59 that performs the model integration processing. The model integrator 59 integrates the first model information and the second model information. For example, the model integrator 59 extracts characteristic points from a shape indicated by the first model information from the first detection device 1a. The model integrator 59 extracts characteristic points from a shape indicated by the second model information from the second detection device 1b. The characteristic points are parts discriminable from other parts in the shape indicated by each piece of model information. For example, a part defined as a surface in the surface information is discriminable from another surface by its peripheral shape or the like. For example, the model integrator 59 extracts the characteristic points by using at least one of the shape information and the texture information included in each piece of model information. For example, the model integrator 59 matches the characteristic points between the first model information and the second model information and detects characteristic points common to the first model information and the second model information. The model integrator 59 calculates a relative position and a relative attitude between the shape indicated by the first model information and the shape indicated by the second model information by using the characteristic points common to the first model information and the second model information and integrates the first model information and the second model information.

For example, the model integrator 59 performs the model integration processing by using at least a part of the reliability information supplied from the first detection device 1a (the first reliability information) and the reliability information supplied from the second detection device 1b (the second reliability information). For example, the model integrator 59 selects information for use in integration from the model information on the basis of the reliability information. For example, when extracting the characteristic points from the shape indicated by the model information, the model integrator 59 extracts the characteristic points from an area the reliability of which is relatively high in this shape. For example, when the shape indicated by the first model information and the shape indicated by the second model information have an overlapped part, the model integrator 59 compares the reliability of the first model information with the reliability of the second model information at the overlapped part by using the first reliability information and the second reliability information and represents the shape of the overlapped part by using the model information the reliability of which is relatively high. For example, the model integrator 59 may weight (calculate the weighted average of) the first model information and the second model information for the overlapped part to integrate the shape information. The weighted average includes, for example, an arithmetic average, a geometrical average, and an exponential average (an exponentially weighted moving average). For example, the coefficient of this weighting is determined on the basis of the reliability of the first model information in the overlapped part and the reliability of the second model information in the overlapped part.

Figure 14:
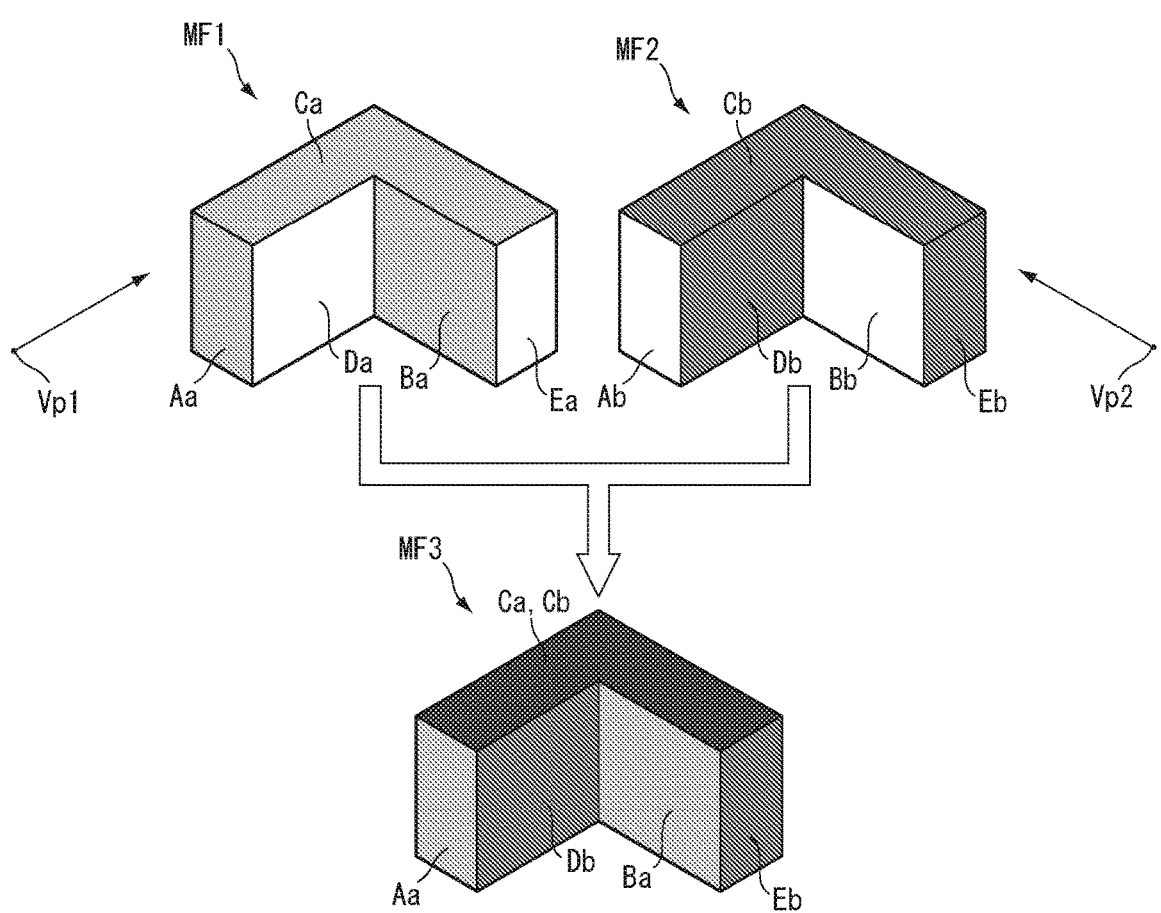
FIG. 14 is a conceptual diagram of an example of model integration processing according to the third embodiment.

FIG. 14 is a conceptual diagram of an example of the model integration processing. The symbol MF1 is a model shape generated on the basis of a detection result from the viewpoint (the first viewpoint) Vp1 of the first detection device 1a. The symbol MF2 is a model shape generated on the basis of a detection result from the viewpoint (the second viewpoint) Vp2 of the second detection device 1b. The symbol MF3 is a model shape that has been integrated (an integrated model shape).

In the model shape MF1 viewed from the viewpoint Vp1, for example, a surface Aa, a surface Ba, and a surface Ca have high reliability (reliability) in detection result from the viewpoint Vp1. In the model shape MF1, for example, a surface Da and a surface Ea have low reliability (reliability) in the detection result from the viewpoint Vp1. In the model shape MF2 viewed from the viewpoint Vp2, the direction of which differs from the direction of the viewpoint Vp1 with respect to the object OB, for example, a surface Cb, a surface Db, and a surface Eb have high reliability (reliability) in detection result from the viewpoint Vp2. In the model shape MF2, for example, a surface Ab and a surface Bb have low result reliability (reliability) in the detection result from the viewpoint Vp2. In such a case, for example, the model integrator 59 uses the surface Aa and the surface Ab of the model shape MF1 for the generation of the model shape MF3 and uses the surface Db and the surface Eb of the model shape MF2 for the generation of the mode shape MF3. For example, the model integrator 59 weights the surface Ca of the model shape MF1 and the surface Cb of the model shape MF2 and uses them for the surface (Ca, Cb) of the model shape MF3.

The method for integrating the first model information and the second model information by the model integrator 59 is not limited to the example described above. For example, the model integrator 59 may perform the model integration processing by using the relative position and the relative attitude of the first detection device 1a and the second detection device 1b. The model integrator 59 may perform the model integration processing by using the relative position of the viewpoint of the first detection device 1a and the viewpoint of the second detection device 1b and the relation between the orientation of the viewpoint (the line of sight) of the first detection device 1a and the orientation of the viewpoint (the line of sight) of the second detection device 1b. The information processing device 51 may include the model integrator 59 and does not necessarily include the rendering processor 57. For example, the information processing device 51 may output the result of the model integration processing to an external device, and a rendering processor included in this external device may execute the rendering processing.

The model integrator 59 may be included in at least one detection device out of a plurality of detection devices (for example, the first detection device 1a and the second detection device 1b). For example, the first detection device 1a may include the model integrator 59. In this case, for example, the first detection device 1a may receive the second model information from a detection device separate from the first detection device 1a (the second detection device 1b) by the communicator 6, and the model integrator 59 may integrate the first model information calculated by the information calculator 4 of the first detection device 1a and the second model information.

The technical scope of the present invention is not limited to the modes described in the above-mentioned embodiments and the like. At least one of the elements described in the above-mentioned embodiments and the like may be omitted. The elements described in the above-mentioned embodiments and the like may be combined as appropriate. To the extent allowed by laws, the disclosure of all the literature cited in the above-mentioned embodiments and the like is incorporated herein by reference.

The invention claimed is:

1. A detection device comprising:
   a main body;
   a detector disposed in the main body, the detector including a distance measurer that includes a light source that irradiates an object with light, an image-forming optical system that forms an image of the object irradiated with the light, and an image sensor that receives the image formed by the imaging-forming optical system, the distance measurer configured to optically detect a distance from a single viewpoint to a point on the object based on a detection result of the image sensor; and
   a microcomputer disposed in the main body and including a processor programmed to function as a reliability calculator and an information calculator, wherein
   the reliability calculator is in communication with the detector and calculates reliability information on the object at the single viewpoint based on optical characteristics of the image-forming optical system,
   the information calculator is in communication with the detector and calculates shape information on the object at the single viewpoint by using the detection result of the detector and the reliability information, and calculates texture information on the object at the single viewpoint by using the detection result, and
   the information calculator generates model information on the object at the single viewpoint based on the shape information and the texture information.

2. The detection device according to claim 1, wherein
   the reliability calculator calculates the reliability information for each area of the object, and
   the information calculator associates the reliability information calculated for each area of the object with the shape information or the texture information.

3. The detection device according to claim 1, wherein the detection result of the detector includes image data of the detected object.

4. The detection device according to claim 1, wherein the reliability information includes information with the detection result weighted in order to calculate the shape information or the texture information.

5. The detection device according to claim 1, wherein the reliability calculator calculates, as the reliability information, information that discriminates between a first area detectable from the single viewpoint and a second area shaded by the first area when viewed from the single viewpoint in an area including the object.

6. The detection device according to claim 5, wherein the reliability calculator determines an area that is, on a line connecting the single viewpoint with a point on the object, farther from the single viewpoint than the point, to be the second area.

7. The detection device according to claim 5, wherein the reliability calculator calculates, as the reliability information, information that indicates that the second area is an area that is undetectable from the single viewpoint.

8. The detection device according to claim 1, wherein the reliability calculator calculates information that discriminates between a surface of the object detected by the detector and an area between the surface and the single viewpoint.

9. The detection device according to claim 8, wherein the reliability calculator calculates information that indicates that a gap is present between the surface and the single viewpoint.

10. The detection device according to claim 1, wherein the reliability calculator calculates the reliability information based on the distance detected by the distance measurer.

11. The detection device according to claim 1, wherein the detector includes an imager that images the object, and the reliability calculator calculates the reliability information based on at least one of a distance from a field-of-view center of the imager, brightness in a taken image by the imager, and aberration of an optical system of the imager for each area on the object detected by the detector.

12. The detection device according to claim 1, wherein the reliability information includes at least one of a reliability, reliability distribution, and an expected value that a body exists at a position in an area including the object.

13. The detection device according to claim 1, wherein depth information including a distance from the single viewpoint to the point on the object is generated based on the detection result of the detector, and the information calculator generates information in which the depth information and the reliability information are associated with each other.

14. The detection device according to claim 1, wherein the information calculator generates, as the shape information, information in which point cloud data including coordinates of a plurality of points on the object is calculated based on the detection result of the detector, and the point cloud data and the reliability information are associated with each other.

15. The detection device according to claim 14, wherein the reliability calculator generates the reliability information on the point cloud data by using the point cloud data calculated by the information calculator.

16. The detection device according to claim 15, wherein the reliability calculator generates the reliability information on the point cloud data by using at least a part of distance information on two points included in the point cloud data, spatial frequency information on a plurality of points included in the point cloud data, vector information connecting two points included in the point cloud data, and positional information on the single viewpoint.

17. The detection device according to claim 1, wherein the information calculator calculates, as the shape information, surface information including coordinates of a plurality of points on the object and link information among the points by using the detection result of the detector and the reliability information.

18. The detection device according to claim 17, wherein
the surface information includes information on a line connecting two points on the object and information on a surface surrounded by three or more lines connecting two points on the object, and
the information calculator generates the information on the surface by using the reliability information on the information on the lines.

19. The detection device according to claim 17, wherein
the reliability calculator generates the reliability information on the point cloud data by using the surface information, and
the information calculator recalculates at least a part of the surface information by using the reliability information on the point cloud data.

20. The detection device according to claim 1, further comprising a processor configured to function as a model integrator that receives the model information and second model information including at least one of shape information and texture information on the object at a viewpoint that is different from the single viewpoint and integrates the model information and the second model information.

21. The detection device according to claim 1 that outputs digital information including at least a part of the model information.

22. A detection system comprising:
the detection device according to claim 1; and
an information processing device that processes information output from the detection device.

23. A detection device comprising:
a main body:
a detector disposed in the main body, the detector including a distance measurer that includes a light source that irradiates an object with light, an image-forming optical system that forms an image of the object irradiated with the light, and an image sensor that receives the image formed by the imaging-forming optical system, the distance measurer configured to optically detect a distance from a single viewpoint to a point on the object based on a detection result of the image sensor; and
a microcomputer disposed in the main body and including a processor programmed to function as a reliability calculator and an information calculator, wherein
the reliability calculator is in communication with the detector and calculates reliability information on the object at the single viewpoint based on optical characteristics of the image-forming optical system, and
the information calculator is in communication with the detector and calculates point cloud data that indicates coordinates among a plurality of points on the object by using the detection result and the reliability information and calculates shape information on the object at the single viewpoint based on the point cloud data.

24. The detection device according to claim 23, wherein the information calculator, when estimating a surface between a point selected from a plurality of points in the point cloud data and a nearby point thereof, selects the nearby point by using the reliability information.

25. The detection device according to claim 23, wherein the information calculator, when estimating a surface between a point selected from a plurality of points in the point cloud data and a nearby point thereof, selects a point with a relatively high reliability.

26. The detection device according to claim 23, wherein
the detection result includes a taken image of the object, and
the reliability calculator calculates, as the reliability information, information in which each pixel of the taken image is associated with a reliability.

27. The detection device according to claim 23 that outputs digital information including the shape information.

28. A detection device comprising:
a main body;
a detector disposed in the main body, the detector including a distance measurer that includes a light source that irradiates an object with light, an image-forming optical system that forms an image of the object irradiated with the light, and an image sensor that receives the image formed by the imaging-forming optical system, the distance measurer configured to optically detect a distance from a single viewpoint to a point on the object based on a detection result of the image sensor; and
a microcomputer disposed in the main body and including a processor programmed to function as a reliability calculator and an information calculator, wherein
the reliability calculator is in communication with the detector and calculates reliability information on the object at the single viewpoint by using a taken image imaged by the detector, and
the information calculator is in communication with the detector and calculates texture information on the object at the single viewpoint by using the taken image and the reliability information.

29. The detection device according to claim 28, wherein the information calculator calculates point cloud data that indicates coordinates among a plurality of points on the object by using the taken image and calculates shape information on the object at the single viewpoint based on the point cloud data.

30. The detection device according to claim 28 that outputs digital information including the texture information or the shape information.

31. A detection system comprising:
a plurality of the detection devices according to claim 1; and
an information processing device that processes information output from the detection devices, wherein
the detection devices each output model information including at least one of the shape information and the texture information, and
the information processing device includes a processor configured to function as a model integrator that integrates pieces of information output from the detection devices.

32. The detection system according to claim 31, wherein the model integrator integrates the pieces of information output from the detection devices by using the reliability information.

33. The detection system according to claim 31, wherein the information processing device comprises a rendering processor that performs rendering processing.

34. The detection system according to claim 33, wherein the rendering processor performs the rendering processing by using the reliability information.

35. A method of detection comprising:
   detecting an object by a detector disposed in a main body, the detector including a distance measurer that includes a light source that irradiates an object with light, an image-forming optical system that forms an image of the object irradiated with the light, and an image sensor that receives the image formed by the imaging-forming optical system, the distance measurer configured to optically detect a distance from a single viewpoint to a point on the object based on a detection result of the image sensor;
   calculating, with a microcomputer disposed in the main body and including a processor, reliability information on the object at the single viewpoint based on optical characteristics of the image-forming optical system;
   calculating, with the microcomputer, shape information on the object at the single viewpoint by using the detection result of the detector and the reliability information, and calculating texture information on the object at the single viewpoint by using the detection result; and
   generating, with the microcomputer, model information on the object at the single viewpoint based on the shape information and the texture information.

36. A non-transitory computer-readable medium storing therein a processing program that processes a detection result obtained by detecting an object by a detector disposed in a main body, the detector including a distance measurer that includes a light source that irradiates an object with light, an image-forming optical system that forms an image of the object irradiated with the light, and an image sensor that receives the image formed by the imaging-forming optical system, the distance measurer configured to optically detect a distance from a single viewpoint to a point on the object based on a detection result of the image sensor, the processing program causing a microcomputer including a processor to execute:
   calculating reliability information on the object at the single viewpoint based on optical characteristics of the image-forming optical system; and
   calculating at least one of shape information and texture information on the object at the single viewpoint by using the detection result of the detector and the reliability information.

* * * * *